United States Patent
Nakazeki et al.

(10) Patent No.: US 8,215,898 B2
(45) Date of Patent: Jul. 10, 2012

(54) TURBINE UNIT FOR REFRIGERATING/COOLING AIR CYCLE

(75) Inventors: Tsugito Nakazeki, Iwata (JP); Takayoshi Ozaki, Iwata (JP); Hiroyuki Yamada, Iwata (JP)

(73) Assignee: NTN Corporation, Osaka (JP)

( * ) Notice: Subject to any disclaimer, the term of this patent is extended or adjusted under 35 U.S.C. 154(b) by 1066 days.

(21) Appl. No.: 12/064,761

(22) PCT Filed: Aug. 23, 2006

(86) PCT No.: PCT/JP2006/316461
§ 371 (c)(1),
(2), (4) Date: Feb. 25, 2008

(87) PCT Pub. No.: WO2007/023836
PCT Pub. Date: Mar. 1, 2007

(65) Prior Publication Data
US 2009/0136335 A1    May 28, 2009

(30) Foreign Application Priority Data
Aug. 25, 2005   (JP) ................. 2005-243546

(51) Int. Cl.
*F01D 5/14* (2006.01)
*F03D 11/00* (2006.01)
*F04D 29/38* (2006.01)
*F01B 25/26* (2006.01)
*F04B 17/00* (2006.01)

(52) U.S. Cl. .......... 415/104; 415/118; 417/365

(58) Field of Classification Search ............. 415/104, 415/118, 229; 417/365, 407, 423.12
See application file for complete search history.

(56) References Cited

U.S. PATENT DOCUMENTS

| | | | | |
|---|---|---|---|---|
| 3,220,244 A | * | 11/1965 | Donnelly | 73/37.6 |
| 5,310,311 A | * | 5/1994 | Andres et al. | 415/229 |
| 5,548,214 A | * | 8/1996 | Yasohama et al. | 324/240 |
| 5,836,739 A | * | 11/1998 | Haramura et al. | 415/104 |
| 6,367,241 B1 | * | 4/2002 | Ress et al. | 60/784 |

(Continued)

FOREIGN PATENT DOCUMENTS
GB    2 298 901    12/1990
(Continued)

OTHER PUBLICATIONS
Ozaki et al. (JP 2001-182682) translation.*
(Continued)

*Primary Examiner* — Edward Look
*Assistant Examiner* — Su Htay
(74) *Attorney, Agent, or Firm* — Osha • Liang LLP

(57) ABSTRACT

A compressor rotor 6a and a turbine rotor 7a are respectively attached at either end of the main shaft 13 so that the compressor rotor 6a is driven by the power generated by the turbine rotor 7a. The main shaft 13 is supported by rolling contact bearings 15 and 16 relative to the radial direction. The thrust force applied to the main shaft 13 is supported by electromagnets 17. A sensor 18 is provided to detect the thrust force which affects the main shaft 13 through air within the compressor 6 and the expansion turbine 7. In the sensor 18, sensor elements having the properties changeable in accordance with a pressing force and capable to electrically detect the change in the properties are arranged in a circumferential direction of the main shaft. The sensor 18 detects the thrust force from the output of the sensor elements.

26 Claims, 21 Drawing Sheets

U.S. PATENT DOCUMENTS

| | | | |
|---|---|---|---|
| 6,494,108 B1 * | 12/2002 | Van Der Zaag et al. | 73/862.333 |
| 6,579,078 B2 * | 6/2003 | Hill et al. | 417/423.7 |
| 7,430,926 B2 * | 10/2008 | Haaser et al. | 73/862.49 |
| 7,452,133 B2 | 11/2008 | Ohtsuki et al. | |
| 2001/0016170 A1 | 8/2001 | Ozaki et al. | |
| 2004/0150397 A1 | 8/2004 | Kuroe et al. | |
| 2007/0110350 A1 | 5/2007 | Ohtsuki et al. | |
| 2008/0118377 A1 * | 5/2008 | Ante et al. | 417/407 |

FOREIGN PATENT DOCUMENTS

| | | | |
|---|---|---|---|
| JP | 59163531 A | | 9/1984 |
| JP | 7-91760 | | 4/1995 |
| JP | 7-259855 A | | 10/1995 |
| JP | 08242557 A | | 9/1996 |
| JP | 8-261237 | | 10/1996 |
| JP | 2623202 | | 4/1997 |
| JP | 11064124 A | | 3/1999 |
| JP | 2000-97507 | | 4/2000 |
| JP | 2000-121184 | | 4/2000 |
| JP | 2000-337975 | | 12/2000 |
| JP | 2001033322 A | * | 2/2001 |
| JP | 2001-182682 | | 7/2001 |
| JP | 2001-523348 | | 11/2001 |
| JP | 2003-194639 | | 7/2003 |
| JP | 2004-84738 | | 3/2004 |
| JP | 2004144596 A | | 5/2004 |
| JP | 2004332796 A | | 11/2004 |
| JP | 2005017076 A | | 1/2005 |
| WO | 99/45601 | | 9/1999 |
| WO | 03/009403 | | 1/2003 |

OTHER PUBLICATIONS

Iwamoto et al. (JP 2001033322 A); Iwamoto et al. (JP 2001033322 A) translation; Iwamoto et al. (JP 2001033322 A) Abstract translation.*

International Search Report (Japanese and English) for PCT/JP2006/316461 mailed Oct. 24, 2006 (4 pages).
Patent Abstracts of Japan 2000-121184 dated Apr. 28, 2000 (1 page).
Patent Abstracts of Japan 08-261237 dated Oct. 8, 1996 (1 page).
Patent Abstracts of Japan 2004-084738 dated Mar. 18, 2004 (1 page).
Patent Abstracts of Japan 2003-194639 dated Jul. 9, 2003 (1 page).
Patent Abstracts of Japan 2000-337975 dated Dec. 8, 2000 (1 page).
Patent Abstracts of Japan 2001-182682 dated Jul. 6, 2001 (1 page).
Patent Abstracts of Japan 2000-097507 dated Apr. 4, 2000 (1 page).
Patent Abstracts of Japan 06-207755 dated Jul. 26, 1994 (1 page).
Patent Abstracts of Japan 07-091760 dated Apr. 4, 1995 (1 page).
Nikkei Mechanical Magazine, "Cooling Air with Air" Issued on Nov. 13, 19995, No. 467, pp. 46 to 52.
English Translation of the International Preliminary Report on Patentability and Written Opinion of the International Searching Authority, for PCT/JP2006/316461, mailed Mar. 20, 2008, 8 pages.
Office Action Issued in Japanese Patent Application No. 2006-224900, Dated Feb. 28, 2012 (12 pages with English Translation).
English Patent Abstract of JP 2004332796, Publication Date: Nov. 25, 2004 (1 page).
English Patent Abstract of JP 2005017076, Puiblication Date: Jan. 2, 2005 (1 page).
English Patent Abstract of JP 59163531, Publication Date: Sep. 14, 1984 (1 page).
English Patent Abstract of JP 11064124, Publication Date Mar. 5, 1999 (1 page).
English Patent Abstract of JP 2004144596, Publication Date: May 20, 2004 (1 page).
English Patent Abstract of JP 07259855, Publication Date: Oct. 9, 1995 (1 page).
English Patent Abstract of JP 08242557, Publication Date: Sep. 17, 1996 (1 page).

* cited by examiner

TURBINE UNIT FOR REFRIGERATING/COOLING AIR CYCLE

FIELD OF THE INVENTION

The present invention relates to a unit for refrigerating/cooling air cycle which is used in refrigerated warehouses, low temperature rooms at zero degrees or lower and for air conditioning.

BACKGROUND OF THE INVENTION

The use of air as a coolant is preferable from the point of view of environmental protection and safety, but does not provide sufficient properties in terms of energy efficiency in comparison with the case where chlorofluorocarbons, ammonium gas or the like is used. In the case where air is used as a coolant in a facility where it can be directly blown into, such as refrigerated warehouses, however, there is a possibility that the total cost can be lowered to that of the existing system by devising a means for omitting fans within a warehouse or defrosting systems. At present, the use of chlorofluorocarbons as a coolant has already been regulated from an environmental point of view, and it is also desired to avoid the use of other gases as a coolant as much as possible. Therefore, air cycle refrigerating/cooling systems in which air is used as a coolant in such applications as described above have been proposed (for example, Patent Document 1 and Non-Patent Document 1).

In addition, it has been stated that the theoretical efficiency of cooling with air becomes the same as or higher than that with chlorofluorocarbons or ammonium gas in a deeply cold range from −30° C. to −60° C. (Non-Patent Document 1). It has also been stated, however, that the above described theoretical efficiency of cooling with air can be attained only with peripheral apparatuses which are optimally designed. The peripheral apparatuses include a compressor, an expansion turbine and the like.

Turbine units where a compressor rotor and an expansion turbine rotor are attached to the same main shaft are used as the compressor and the expansion turbine (Patent Document 1, Non-Patent Document 1).

Here, magnetic bearing type turbine compressors where a turbine rotor is attached to one end of the main shaft, a compressor rotor is attached to the other end, and the above described main shaft is supported by a journal bearing and a thrust bearing, each bearing is controlled with a current through an electromagnet, have been proposed as a turbine compressor for processing a process gas (Patent Document 2).

In addition, a reduction in the thrust load which affects the rolling contact bearing through the use of a thrust magnetic bearing has been proposed for gas turbine engines in order to prevent the thrust load which affects the rolling contact bearing for supporting the main shaft from making the life of the bearing shorter (Patent Document 3).

Patent Document 1: Japanese Patent No. 2623202
Patent Document 2: Japanese Laid-open Patent Publication No. 7-91760
Patent Document 3: Japanese Laid-open Patent Publication No. 8-261237
Non-Patent Document 1: Nikkei Mechanical Magazine, "Cooling Air with Air," issued on Nov. 13, 1995, No. 467, pages 46 to 52

As described above, air cycle refrigerating/cooling systems require an optimally designed compressor and expansion turbine in order to attain the theoretical efficiency of air cooling, which becomes of a high efficiency in the deeply cold range.

As described above, turbine units where a compressor rotor and an expansion turbine rotor are attached to the same main shaft are used as the compressor and the expansion turbine. In these turbine units, the compressor rotor can be driven with the power generated by the expansion turbine, and thus, the efficiency of the air cycling refrigerator is increased.

In order to attain the efficiency for practical use, however, it is necessary to keep the gap between the rotors and the housing microscopic. Fluctuations of this gap prevent a stable high speed rotation, and thus, cause a reduction in the efficiency.

In addition, air which affects the compressor rotor and the turbine rotor makes the thrust force affect the main shaft, and thus, a thrust load is imposed on the bearing for supporting the main shaft. The rotational speed of the main shaft of the turbine unit for refrigerating/cooling air cycle is 80,000 to 100,000 rotations per minute, which is a very high speed in comparison with bearings for general applications. Therefore, thrust loads as described above cause the durability of the bearing for supporting the main shaft to decrease and the life to become shorter, and thus, decreases the reliability of the turbine unit for air cycle refrigerating/cooling. It is difficult to put a turbine unit for air cycle refrigerating/cooling into practice, and thus, put an air cycle refrigerating/cooling system into practice without solving the problem of the durability of the bearing as described above. The above described technologies disclosed in Patent Document 1 and Non-Patent Document 1, however, do not solve the problem where the durability of the bearing against the thrust load for such a high speed rotation decreases.

In such a magnetic bearing type turbine compressor as that of Patent Document 2 where the main shaft is supported by a journal bearing made up of a magnetic bearing and a thrust bearing made up of a magnetic bearing, the journal bearing does not have a function of restricting movement in the axial direction. Therefore, when there is an unstable factor in the control of the thrust bearing, it is difficult to provide a stable high speed rotation while keeping a microscopic gap between the above described rotors and housing. In the case of a magnetic bearing, there is also a problem of contact at the time of power failure.

In, addition, in the turbine unite for refrigerating/cooling air cycle of the case where the main shaft is rotatably supported by a rolling contact bearing and part or the entirety of the thrust force applied to the main shaft is supported by an electromagnet on the basis of the output of a sensor for detecting the thrust force which affects the main shaft, when the precision in detecting the thrust force which affects this main shaft is low, the thrust force applied to the bearing cannot be effectively reduced, and thus, the durability of the bearing cannot be secured.

SUMMARY OF THE INVENTION

An object of this invention is to provide a turbine unit for refrigerating/cooling air cycle where a stable high speed is obtained while keeping a rotor working clearance, and an increase in the durability of the bearing for supporting the main shaft, the life and the reliability can be achieved at low cost.

The turbine unit for refrigerating/cooling air cycle according to the present invention includes a compressor, an expansion turbine, a main shaft, a rolling contact bearing for supporting the main shaft, an electromagnet for supporting part or the entirety of a thrust force applied to the main shaft, a sensor for detecting the thrust force and a controller for controlling a support force by the electromagnet in accordance with an output of the sensor. The compressor has a compressor rotor and the expansion turbine having a turbine rotor. A compressor rotor of the compressor and a turbine rotor of the expansion turbine are attached to the main shaft so that the compressor rotor is driven by the power generated by the turbine rotor, or by a motor having a motor rotor attached to the main shaft.

The sensor is interposed between a stationary outer ring of the rolling contact bearing and a spindle housing for supporting the outer ring, and the sensor including sensor elements are arranged in a circumferential direction of the main shaft. Each sensor element has the properties changeable in accordance with a pressing force urged thereupon and capable to electrically detect the change in the properties, thereby to detect the thrust force from the output of the sensor elements. Preferably, the above described rolling contact bearing may be a type capable to sustain a relative position between the inner and outer rings in the axial direction, for example, a deep groove ball bearing. It may also be an angular contact ball bearing.

In the air cycle refrigerating/cooling system according to the present invention, intake air is compressed by a pre-compressing unit accompanied by elevated temperature and cooled by a heat exchanger. The cooled air is further compressed by the compressor in the turbine with the air temperature increased, and then is again cooled by another heat exchanger. This cooled air is led to the expansion turbine in the turbine unit so as to be cooled through adiabatic expansion to the target temperature, that is, a very low temperature of, for example, approximately −30° C. to −60° C., and then discharged.

The turbine unit where a compressor rotor and a turbine rotor in the above described expansion turbine are attached to the common main shaft drives the compressor rotor with the power generated in the turbine rotor, and therefore, requires no power source, and thus, allows the compact configuration to efficiently cool.

The turbine unit for refrigerating/cooling air cycle according to this invention may be driven by a motor having a motor rotor and a motor stator confronting the motor rotor in addition to the above. The invention may be applied to an air cycle refrigerating/cooling system where the intake air is cooled by a heat exchanger, compressed by a compressor of a turbine unit, cooled by another heat exchanger, and adiabatically expanded by an expansion turbine of the turbine unit in sequence, and the motor rotor is attached to the common main shaft so that the main shaft can be rotated by means of a magnetic force from the motor stator confronting the motor rotor, and thus, the compressor rotor is driven in the turbine unit for air cycle refrigerating/cooling.

In the case where the main shaft is driven by providing a motor, it becomes unnecessary to provide a pre-compressing means, such as a blower, in the stage before the compressor.

In order to secure the efficiency in the compression and expansion of this turbine unit, it is necessary to keep the gap between the rotors and the housing minute. It is important to secure this efficiency of the air cycle refrigerating/cooling system. In order to do so, the main shaft of the rotors is supported by a rolling contact bearing so that the position of the main shaft is restricted to a certain degree due to the function of restricting movement in the axial direction by the rolling contact bearing, and thus, the minute gap between the rotors and the housing can be kept constant.

However, a thrust force is applied to the main shaft of the turbine unit due to air pressure or the like which affects the rotors. In addition, the turbine unit used in the air cooling system provides a very high rotational speed of, for example, approximately 80,000 to 100,000 rotations per minute. Therefore, when the above described thrust force affects the rolling contact bearing for supporting the rotating main shaft, the durability of the bearing is reduced.

According to this invention, the above described thrust force is supported by an electromagnet with no contact with the main shaft, and therefore, the thrust force which affects the rolling contact bearing for supporting the main shaft can be reduced while preventing the torque from increasing. In this case, a sensor for detecting the thrust force which affects the above described main shaft through the air within the above described compressor and expansion turbine and a controller for controlling the support force by the above described electromagnet in accordance with the output of this sensor are provided, and therefore, the rolling contact bearing can be used in such a state as to be optimal for the thrust force in accordance with the specification of this bearing. Therefore, a stable high speed rotation of the main shaft can be obtained with the rotors keeping appropriate gaps, and the durability and the life of the rolling contact bearing can be increased. The durability of the rolling contact bearing for supporting the main shaft increases, and therefore, as a whole, the reliability of the turbine unit for air cycle refrigerating/cooling increases, and thus, as a whole, the reliability of the air cycle refrigerating/cooling system increases. In this manner, the stable high speed rotation, durability and reliability of the main shaft bearing in the turbine unit, which is an obstacle of the air cycle refrigerating/cooling system, can be increased, and therefore, the air cycle refrigerating/cooling system can be put into practice.

The rolling contact bearings may be disposed in the vicinity of the compressor rotor in the spindle housing and in the vicinity of the turbine rotor. In this case, the main shaft is supported at opposite ends, and therefore, a more stable rotation at high speed can be attained.

The sensor includes sensor elements arranged in a circumferential direction of the main shaft, and each sensor element has the properties changeable in accordance with a pressing force urged thereupon and capable to electrically detect the change in the properties, thereby to detect the thrust force from the output of the sensor elements. The sensor is interposed between the outer ring of the rolling contact bearing and the spindle housing for supporting the outer ring.

Since a plurality of sensor elements are disposed in the circumferential direction, the thrust force which works between the outer ring of the rolling contact bearing and the spindle housing can be detected without detection errors caused due to inclination of the sensor. In addition, since a plurality of sensor elements are used, the forces applied to a plurality of locations in the circumferential direction can be detected and averaged.

The above described sensor elements may be interposed between two members formed in ring shape through which the above described main shaft penetrates. Since the sensor elements are interposed between two members formed in ring shape, the plurality of sensor elements can be handled as an integrated sensor unit providing excellent assembly.

More specifically, the sensor may include a plurality of magnetostrictors or super magnetostrictors arranged in the circumferential direction of the main shaft and detects a permeability of the magnetostrictors or super magnetostrictors thereby to detect the thrust force. The plurality of magnetostrictors or super magnetostrictors may be sandwiched between two yolk members made of a soft magnetic material. A second yolk member may be placed between the two yolk members and may be made of a soft magnetic material slightly shorter than the magnetostrictors or super magnetostrictors.

When magnetostrictors or super magnetostrictors are used as the sensor elements, the pressing force can precisely be detected. In addition, when the above described second yolk members are used, the magnetic resistance in a magnetic path can be reduced and as a result, the sensitivity of the sensor can be increased. When the length of the above described second yolk members is slightly shorter than the above described magnetostrictors or super magnetostrictors, the entirety of the detected thrust force works on the magnetostrictors or super magnetostrictors, and therefore, the pressing force can precisely be detected.

Preferably, the turbine unit for refrigerating/cooling air cycle according to this invention may include a permanent magnet magnetized in the direction of the thickness and provided on each of the magnetostrictors or super magnetostrictors in such a manner as to make direct contact with an end face thereof, and the magnetostrictor or super magnetostrictor and the permanent magnet are sandwiched between two yolk members made of a soft material More preferably, the turbine unit may include a second yolk member placed between the two yolk members and made of a soft magnetic material slightly shorter than the total length of the magnetostrictor or super magnetostrictor and the permanent magnet, that are layered on top of each other.

When permanent magnets are used, a bias magnetic field can be provided so that the locations where the permeability of the magnetostrictors or super magnetostrictors largely changes can be selected and used for detection, and thus, the sensitivity for detection can be increased. When the length of the above described second yolk members is slightly shorter than the above described magnetostrictors or super magnetostrictors, the entirety of the detected thrust force works on the magnetostrictors or super magnetostrictors, and therefore, the pressing force can precisely be detected.

In the case of a sensor for detecting a thrust force by detecting the permeability of the above described magnetostrictors or super magnetostrictors, the sensor includes a magnetostrictor or super magnetostrictor and a sensor coil arranged therearound, and detects the permeability of the magnetostrictor or super magnetostrictor by measuring the inductance of the sensor coil. Preferably, a plurality of sensors are provided so as to be connected in series so that the outputs of the sensor coils are averaged. More preferably, an even number of the sensor coils and the magnetostrictors or super magnetostrictors are provided in such a manner that electric currents flow through neighboring sensor coils in opposite directions.

In the case where a thrust force is detected by measuring the inductance of the sensor coils, the change in the permeability can precisely be detected. In addition, when a plurality of sensor coils are used and the outputs of these sensors are averaged, the thrust force can precisely be detected. Furthermore, when a plurality of sensor coils are connected in series, an inductance which corresponds to the total of the inductances of the respective sensor coils appears across opposite ends of the entirety of the connected sensor coils, and therefore, the inductances of the respective sensor coils are averaged by detecting the change in the inductance of this entirety so that an averaging process can easily be carried out. Furthermore, an even number of the above described magnetostrictors or super magnetostrictors are provided in such a manner that the electric currents flow through neighboring sensor coils in the directions opposite to each other, and thus, almost common magnetic flux can pass through the above described magnetostrictors or super magnetostrictors so that the inductance properties of the respective sensor coils can be made identical, and therefore, the thrust force can precisely be detected.

In the case of a sensor for detecting a thrust force by detecting the permeability of the above described magnetostrictors or super magnetostrictors, the sensor may utilize resonance between the inductance of the sensor coil and the capacitance of the condenser separate from the sensor, to measure change in the inductance from the change in the resonant frequency, which changes in accordance with the change in the inductance.

Since the change in the above described inductance is measured from the change in the resonant frequency, the change in the permeability can precisely be detected.

In the case of a sensor for detecting a thrust force by detecting the permeability of the above described magnetostrictors or super magnetostrictors, the above described sensor may use the resonance between the inductance of the above described sensor coils and a separately installed condenser when a carrier wave having a constant frequency and a voltage with a constant amplitude is inputted into one end of the above described sensor coils so as to measure the change in the above described inductance from the amplitude of the voltage at the other end of the above described sensor coils, which changes in accordance with the change in the above described inductance. According to this feature, the change in the permeability can also precisely be detected.

In the case of a sensor for detecting a thrust force by detecting the permeability of the above described magnetostrictors or super magnetostrictors, the sensor may include an exciting coil arranged around the magnetostrictor or super magnetostrictor in addition to the sensor coil and supplies an alternating exciting current having a constant frequency and a constant amplitude through the exciting coil to detect the voltage induced across the sensor coil, thereby to measure the thrust force.

According to this feature, the changing point in the permeability of the magnetostrictors or super magnetostrictors in response to the change in the load can be appropriately set by controlling the electric current flowing through the exciting coil, and thus, the change in the permeability can precisely be detected.

In the case of a sensor for detecting a thrust force by detecting the permeability of the above described magnetostrictors or super magnetostrictors, the sensor may be a Hall sensor to detect the density of the magnetic flux, which changes together with change in the permeability of the magnetostrictor or super magnetostrictor in the sensor, thereby to measure the thrust force. Hall sensors output the density of the magnetic flux in the environment as an analogue signal when supplied with a direct current from the outside power source, and therefore, the thrust force can be detected easily and at a low cost.

In the above mentioned various typed of sensors, the sensor may include a magnetostrictor or super magnetostrictor and a sensor coil arranged therearound, and detects the permeability of the magnetostrictor or super magnetostrictor by measuring the inductance of the sensor coil, while a temperature sensor may be disposed in the vicinity of the magnetostrictor or super magnetostrictor, and a corrector for correcting the results of measurement of the inductance or the permeability on the basis of the output of the temperature sensor may be provided. The thrust force can precisely be detected by carrying out temperature correction.

Preferably, the sensor may include a plurality of pressure sensitive resistance elements and detect the change in the resistance value of the pressure sensitive resistance elements. The detected values of the pressure sensitive resistance elements may be averaged. When pressure sensitive resistance elements are used, the thrust force can be detected with a simple sensor circuit.

Furthermore, a plurality of pressure sensitive resistance elements are connected in parallel, and thus, an averaging process of the thrust force can be carried out with a simple circuit configuration, and thus, the thrust force can precisely be detected at a low cost.

In the case of a sensor including pressure sensitive resistance elements, a temperature sensor may be arranged in the vicinity of the pressure sensitive resistance elements, and a corrector for correcting the resistance value of the pressure sensitive resistance elements on the basis of the output of the temperature sensor may be provided. The precision in detection can be enhanced as a result of this temperature correction.

Preferably, the sensor may include an elastic member for equalizing the pressure on the surface through which force is applied to the pressure sensitive resistance element. When an elastic member is sandwiched, pressure works equally on the pressure receiving portions of the pressure sensitive resistance elements, and thus, an error in the measurement due to the local application of pressure can be reduced.

The sensor may include a plurality of strain gauges instead of sensors mentioned above. A temperature sensor may be arranged in the vicinity of the strain gauges, and a corrector for correcting the strain measured by the strain gauges on the basis of the output of the temperature sensor may be provided. In the case where a strain gauge is used, the thrust force can precisely be detected with a simple configuration.

A displacement sensor may be employed as the sensor instead of sensors mentioned above. The displacement sensor may be of a magnetic type. It is possible to detect the thrust force in the case where a displacement sensor is employed as well.

The above described sensor may be arranged in the vicinity of the above described rolling contact bearing. In the case where the sensor is arranged in the vicinity of the rolling contact bearing, the thrust force which can adversely affect the rolling contact bearing can be directly measured, and thus, the precision in the measurement is enhanced, making it possible to control the thrust force with high precision.

Therefore, a stable high speed rotation of the main shaft can be attained with the rotors keeping appropriate gaps, and the durability and the life of the rolling contact bearing can be increased. Since the durability of the rolling contact bearing is increased, the reliability of the turbine unit for air cycle refrigerating/cooling as a whole increases, and thus, the reliability of the whole air cycle refrigerating/cooling system increases. In this manner, the stable high speed rotation, durability and reliability of the main shaft bearing in the turbine unit, which is a problem to be solved in the air cycle refrigerating/cooling system, can be increased, and therefore, the air cycle refrigerating/cooling system can be put into practice.

In the turbine unit for refrigerating/cooling air cycle according to this invention, the sensor may be interposed between the outer ring of the rolling contact bearing and the spindle housing for supporting this outer ring directly, or interposed therebetween via another member.

When the sensor is interposed between the outer ring of the rolling contact bearing and the spindle housing, the thrust force of the main shaft, applied to the rolling contact bearing, can precisely be measured with a simple configuration.

Preferably, a bearing housing with which the outer ring of the rolling contact bearing is fixedly engaged may be provided, and the bearing housing is engaged in the inner diametric hole provided in the spindle housing in such a manner as to be moveable in the axial direction, and the sensor is interposed between an end face of the bearing housing and the spindle housing or a member secured to the spindle housing.

According to this feature, since the bearing housing is axially moveable and the sensor is interposed between the bearing housing and the spindle housing, the sensor can be arranged in the wide end face of the bearing housing, and therefore, even in the case where the outer ring is thin in the radical direction, a relatively large sensor can be employed so that the sensitivity and the precision of the measurement can be increased.

The turbine unit may include a first resilient element for applying a preload to the sensor. Though, in general, sensors interposed between members and detecting a force cannot detect a negative force, either thrust force, positive or negative, can be detected by detecting the deviation from the amount of the preload.

The preload applied by means of the first resilient element may be equal to or greater than the average thrust force which is applied to the main shaft through air within the compressor and the expansion turbine.

By providing a preload which is equal to or greater than the average thrust force, a sufficient detectable range can be established for either thrust force, positive or negative with respect to this preload.

It is to be noted that the preload applied by the first resilient element may be approximately the same as the above described average thrust force.

In the turbine unit for refrigerating/cooling air cycle according to this invention, a plurality of rolling contact bearings may be provided, and the sensor is arranged in the vicinity of one of the rolling contact bearings, and other rolling contact bearings are disposed in such a manner as to be moveable in the axial direction relative to the spindle housing and elastically supported by a second resilient element.

Since the other rolling contact bearing is elastically supported by second resilient element, an appropriate preload can be applied to the bearings. Furthermore, this allows the main shaft to be kept in the location in the axial direction with high precision, and the thrust force can precisely be detected by the sensor.

The second resilient element may be interposed between the outer ring of the other rolling contact bearing and the spindle housing, between a member for securing the outer ring of the other rolling contact bearing and the spindle housing, or between the inner ring of the other rolling contact bearing and the main shaft. The second resilient elements can be arranged with a simple configuration when interposed in any of these locations.

In the case where the above described first resilient element and the second resilient elements are both provided, the second resilient element may have a smaller spring constant than the first resilient element.

In the case where the spring constant of the second resilient elements is greater than that of the first resilient element, an excessive preload is applied to both bearings when an excessive thrust force is applied to the main shaft. When the spring constant of the second resilient elements is smaller, such an excessive preload can be prevented from being applied to the bearings, and the preload for detecting the thrust force, which could be either positive or negative, can be provided to the sensor while keeping a stable rotation performance.

In a preferable embodiment of this invention, a plurality of thrust plates in flange form made of a ferromagnetic body may be provided in the main shaft and the electromagnets may be disposed in the spindle housing in face-to-face relation with opposite end faces of each thrust plate.

In the case where the thrust force resulting from air pressure is great in the turbine unit, it is desired to make the diameter of the thrust plates great and the force of the electromagnet greater. However, there is a risk that the system may be destroyed by the centrifugal force during high speed rotation, and thus, there is a limit to the size of the diameter of the thrust plates. In the case where a plurality of thrust plates are employed, the support force against the thrust force can be increased without causing the destruction due to the centrifugal force.

In the case where a plurality of thrust plates are employed, the electromagnets may be divided into a plurality of pieces aligned in the circumferential direction. When the electromagnet is divided into a plurality of pieces, assembly is easy even in the case where a number of thrust plates are provided.

The number of poles, the size and the number of turns of a built-in coil among the individual pieces into which the electromagnets are divided may be set to be the same. With this configuration, an electromagnetic force uniform throughout the entirety of the circumference can be generated. Also, by using identical shape and material for each piece of divided electromagnet, increase in the productivity and ease of assembly can be achieved.

BRIEF DESCRIPTION OF THE DRAWINGS

In any event, the present invention will become more clearly understood from the following descriptions of the preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

BEST MODE FOR CARRYING OUT THE INVENTION

Figure 1:
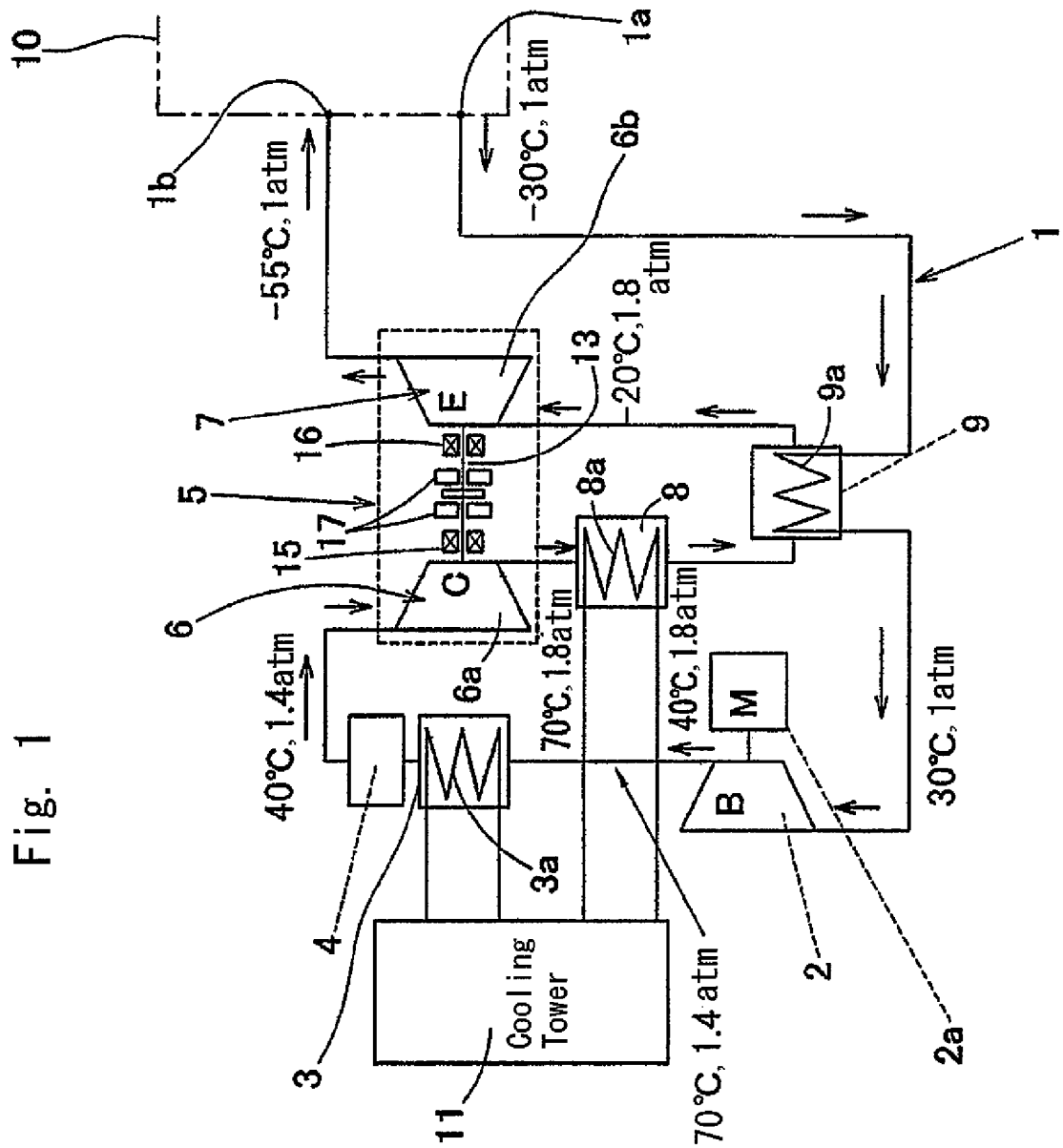
FIG. 1 is a system diagram showing an air cycle refrigerating/cooling system using the turbine unit for refrigerating/cooling air cycle according to the first embodiment of this invention.
Figure 2:
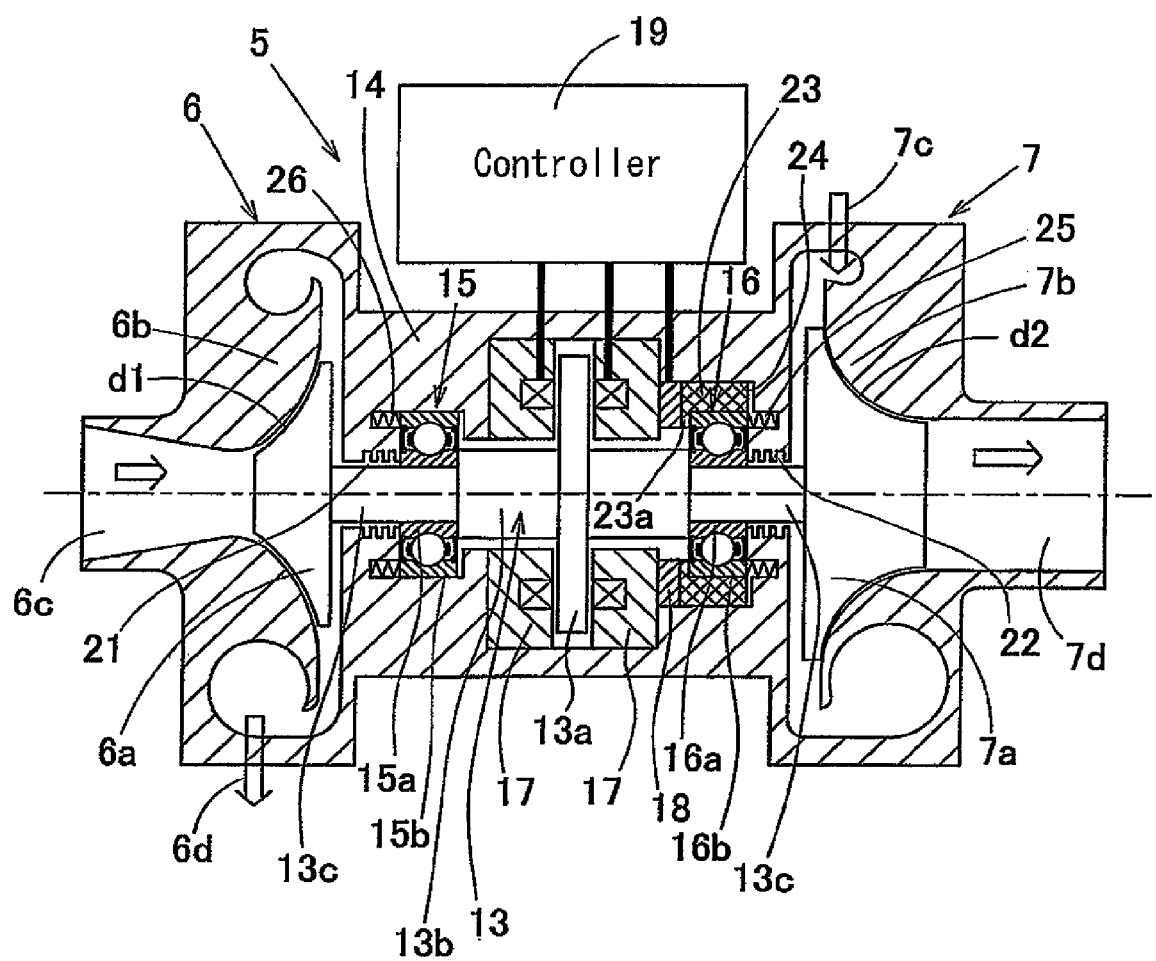
FIG. 2 is a cross sectional diagram showing the turbine unit for refrigerating/cooling air cycle according to the first embodiment of this invention.

The first embodiment of this invention is described in reference to FIGS. 1 and 2. FIG. 1 shows the entire configuration of the air cycle refrigerating/cooling system. This air cycle refrigerating/cooling system is a system for cooling air in a space to be cooled 10, such as a refrigerator, directly as a coolant and has an air circulation path 1 that reaches from an air inlet 1a to an outlet 1b, which are respective openings in the space to be cooled 10. This air circulation path 1 is provided with a pre-compressing unit 2, a first heat exchanger 3, a dehumidifier 4, a compressor 6 in a turbine unit 5 for air cycle refrigerating/cooling, a second heat exchanger 8, an intermediate heat exchanger 9 and an expansion turbine 7 in the above described turbine unit 5 in this order. The intermediate heat exchanger 9 exchanges heat between the air in the vicinity of the inlet 1a that has flown into the air circulation path 1 and the air of which the temperature rises through the compression in the rear stage and which is then cooled by the second heat exchanger 8, and thus, the air in the vicinity of the inlet 1a passes through the heat exchanger core 9a.

The pre-compressing unit 2 is made up of a blower or the like and driven by a motor 2a. The first heat exchanger 3 and the second heat exchanger 8, respectively, have heat exchanger cores 3a and 8a for circulating a coolant and exchange heat between the coolant, such as water, in the heat exchanger cores 3a and 8a and the air in the air circulation path 1. The heat exchanger cores 3a and 8a are respectively connected to a cooling tower 11 through pipes so that the coolant, of which the temperature has risen as a result of heat exchange, is cooled in the cooling tower 11.

This air cycle refrigerating/cooling system is a system where the space to be cooled 10 is kept between approximately 0° C. and −60° C., and air at approximately 0° C. to −60° C. under 1 normal atmosphere (1 atm) flows into the inlet 1a of the air circulation path 1 from the space to be cooled 10. Here, the numerals of the temperature and the air pressure shown in the following are examples which tentatively become a rough standard. The air that has flown into the inlet 1a is used by the intermediate heat exchanger 9 to cool the air in the rear stage of the air circulation path 1, and thus, the temperature rises to 30° C. The air of which the temperature has thus risen stays at 1 normal atmosphere, but is then compressed by the pre-compressing unit 2 to 1.4 normal atmosphere, and the temperature rises to 70° C. as a result of this compression. The first heat exchanger 3 only cools the air of which the temperature has risen to 70° C., and therefore, can efficiently cool the air with cold water of which the temperature is approximately room temperature, and thus, cools the air to 40° C. The dehumidifier 4 dehumidifies the air inside the path in order to prevent the moisture in the air within the air circulation path 1 from being cooled to a sub-zero temperature in the rear stage, which causes clogging in the air circulation path 1 or dragging of the expansion turbine 7.

The air at 40° C. of which the pressure is 1.4 normal atmosphere after dehumidification is compressed by the compressor 6 in the turbine unit 5 to 1.8 normal atmosphere so that the air becomes of a state where the temperature has risen to approximately 70° C. as a result of this compression, and then cooled to 40° C. by the second heat exchanger 8. This air at 40° C. is cooled to −20° C. by air at −30° C. from the space to be cooled 10 in the intermediate heat exchanger 9. The air pressure is maintained at 1.8 normal atmosphere as the air is discharged from the compressor 6.

The air that has been cooled to −20° C. in the intermediate heat exchanger 9 is adiabatically expanded by the expansion turbine 7 in the turbine unit 5 so as to be cooled to −55° C., and then discharged to the space to be cooled 10 from the outlet 1b. This air cycle refrigerating/cooling system carries out such a refrigerating cycle.

FIG. 2 shows an example of a turbine unit 5 for air cycle refrigerating/cooling. This turbine unit 5 has a centrifugal compressor 6 and a radial flow expansion turbine 7 where the compressor rotor 6a of the compressor 6 and the turbine rotor 7a of the expansion turbine 7 are respectively attached to either end of the main shaft 13. In addition, the power generated by the turbine rotor 7a drives the compressor rotor 6a, and no other drive source is provided.

Here, as in the below described example of FIG. 26, for example, the compressor rotor 6a of the compressor 6, the turbine rotor 7a of the expansion turbine 7 and the motor rotor 92 may be attached to the same main shaft 13 so that the main shaft 13 is driven by the drive force of the motor 90. In the case where the motor 90 is provided so as to drive the main shaft 13, it becomes unnecessary to provide a pre-compressing unit 2 (FIG. 1), such as a blower, in the stage before the compressor 6.

In FIG. 2, the compressor 6 has a housing 6b which faces the compressor rotor 6a via a minute gap d1, and the air that has been taken in from an intake 6c in the center portion in the axial direction is compressed by the compressor rotor 6a and discharged from the outlet (not shown) in the outer peripheral portion, as shown by arrow 6d.

The expansion turbine 7 has a housing 7b which faces the turbine rotor 7a via a minute gap d2, and the air that has been taken in from the outer peripheral portion, as shown by arrow 7c, is adiabatically expanded by the turbine rotor 7a and discharged in the axial direction from the outlet 7d in the center portion.

In this turbine unit 5, the main shaft 13 is supported by a spindle housing 14 by way of a number of bearings 15 and 16 in the direction of the radii, and the thrust force applied to the main shaft 13 is supported by an electromagnet 17. This turbine unit 5 has a sensor 18 for detecting the thrust force which affects the main shaft 13 through the air inside the compressor 6 and the expansion turbine 7 and a controller 19 for controlling the support force by the above described electromagnet 17 on the basis of the output of this sensor 18. The electromagnet 17 is installed in the spindle housing 14 so as to face but not make contact with the two surfaces of a thrust plate 13a in flange form made up of a ferromagnetic body provided at the center of the main shaft 13.

The bearings 15 and 16 for supporting the main shaft 13 are rolling contact bearings having a function of restricting movement in the axial direction and, for example, deep groove ball bearings are used. Deep groove ball bearings have a function of supporting the thrust in the two directions and work to return the inner and outer rings to the neutral location in the axial direction. These two bearings 15 and 16 are placed in the vicinity of the compressor rotor 6a and the turbine rotor 7a in the spindle housing 14, respectively.

The main shaft 13 is a shaft with steps having a large diameter portion 13b in the center portion and small diameter portions 13c in the two end portions. The bearings 15 and 16 on both sides have inner rings 15a and 16a, into which the small diameter portions 13c are fitted in a press fitting state, and one end face making contact with a surface on the step between the large diameter portion 13b and a small diameter portion 13c.

The portions of the spindle housing 14 on the rotors 6a and 7a sides of the bearings 15 and 16 on the two sides are formed so as to have a diameter in such a manner that the inner surface is in the vicinity of the main shaft 13, and non-contact seals 21 and 22 are formed on this inner surface. The non-contact seals 21 and 22 are labyrinth seals which are formed by aligning a number of circumferential trenches in the inner surface of the spindle housing 14 in the axial direction.

The above described sensor 18 is provided on the stationary side in the vicinity of the bearing 16 on the turbine rotor 7a side, that is to say, on the spindle housing 14 side. The outer ring 16b of the bearing 16 having this sensor 18 provided close-by is engaged in the bearing housing 23 in a fixed state. The bearing housing 23 is formed in ring form, has an inward flange 23a which engages with the end face of the outer ring 16b of the bearing 16 at one end, and is engaged with the inner diametric hole 24 provided in the spindle housing 14 in such a manner as to be freely moveable in the axial direction. The above described inward flange 23a is provided at the end on the center side in the axial direction.

The sensor 18 intervenes between the end face on the inward flange 23a side of the bearing housing 23 mounted in the spindle housing 14 and one electromagnet 17 which is a member fixed to the spindle housing 14. In addition, a preload is applied to the sensor 18 by means of the first resilient element 25. The first resilient element 25 is contained within a containing recess provided in the spindle housing 14, and presses the outer ring 16b of the bearing 16 in the axial direction so as to apply a preload to the sensor 18 via the outer ring 16b and the bearing housing 23. The first resilient element 25 is made up of, for example, a number of coil springs provided in locations around the main shaft 13 in the circumferential direction.

The preload is applied by the first resilient element 25 so that the sensor 18 for detecting the thrust force through the pressing force can detect the movement of the main shaft 13 in either axial direction, and thus, the preload is equal to or greater than the average thrust force which affects the main shaft 13 when the turbine unit 5 is in a state of normal operation.

The bearing 15 on the side where the sensor 18 is not placed is installed in such a manner as to be freely moveable in the axial direction relative to the spindle housing 14 and elastically supported by a second resilient element 26. In this example, the outer ring 15b of the bearing 15 is engaged with the inner diametric surface of the spindle housing 14 in such a manner as to be freely moveable in the axial direction, and the second resilient element 2 intervenes between the outer ring 15b and the spindle housing 14. The second resilient element 26 faces the surface of the step of the main shaft 13 with which the end face of the inner ring 15a is engaged in such a manner as to press the outer ring 15b and apply a preload to the bearing 15. The second resilient element 26 is made up of a number of coil springs which are provided in locations around the main shaft 13 in the circumferential direction and respectively contained within containing recesses provided in the spindle housing 14. The second resilient element 26 has a smaller spring constant than the first resilient element 25.

The turbine unit 5 having this configuration is used in the air cycle refrigerating/cooling system shown in FIG. 1 in such a manner that air that becomes a coolant is compressed by the compressor 6 so that the temperature increases, and heat can be exchanged efficiently through the heat exchangers 8 and 9, and air that has been cooled through the heat exchangers 8 and 9 is discharged after the temperature is lowered to the target temperature, that is, an extremely low temperature of, for example, approximately −30° C. to −60° C., through adiabatic expansion in the expansion turbine 7.

The compressor rotor 6a and the turbine rotor 7a are attached to the common main shaft 13, and the power generated by the turbine rotor 7a drives the compressor rotor 6a in this turbine unit 5, which requires no power source and can efficiently cool with a compact configuration.

In order to secure the efficiency in compression and expansion of this turbine unit 5, it is necessary to keep the gaps d1 and d2 between the rotors 6a and 7a and the housings 6b and 7b minute. It becomes important for the air cycle refrigerating/cooling system to secure this efficiency. As a means for achieving this, the main shaft 13 is supported by rolling contact type bearings 15 and 16, and therefore, the movement of the main shaft 13 in the axial direction is restricted to a certain degree due to the function of the rolling contact bearings of restricting movement in the axial direction, and thus, minute gaps d1 and d2 between the respective rotors 6a and 7a and the housings 6b and 7b can be kept at a constant distance.

However, a thrust force is applied to the main shaft 13 of the turbine unit 5 through the air pressure which affects the respective rotors 6a and 7a. In addition, the turbine unit 5 used in the air cycle refrigerating/cooling system provides rotations at a very high speed, for example, approximately 80,000 to 100,000 rotations per minute. Therefore, when a thrust force affects the rolling contact bearings 15 and 16 which support the rotating main shaft 13 as described above, the durability of the bearings 15 and 16 is lowered.

In this embodiment, the above described thrust force is supported by the electromagnet 17 with no contact with the main shaft 13, and therefore, the thrust force which affects the rolling contact bearings 15 and 16 for supporting the main shaft 13 can be reduced while preventing the torque from increasing. In this case, a sensor 18 for detecting a thrust force which affects the main shaft 13 through the air within the compressor 6 and the expansion turbine 7, and a controller 19 for controlling the supporting force with the above described electromagnet 17 on the basis of the output of this sensor 18 are provided, and therefore, the rolling contact bearings 15 and 16 can be used in such a state as to be optimal for the thrust force in accordance with the specification of these bearings.

In particular, the sensor 18 is placed in the vicinity of the bearing 16, and therefore, the thrust force which affects the bearing 16, which may cause a problem, can be directly measured with a high precision, and thus, precise control over the thrust force becomes possible.

Therefore, stable high speed rotations of the main shaft 13 can be attained while keeping appropriate gaps d1 and d2 vis-à-vis the respective rotors 6a and 7a, and the durability and the life of the bearings 15 and 16 can be increased. The durability of the bearings 15 and 16 increases, and therefore, as a whole, the reliability of the turbine unit 5 for air cycle refrigerating/cooling increases, and thus, as a whole, the reliability of the air cycle refrigerating/cooling system increases. In this manner, the stability of high speed rotations, the durability and the reliability of the main shaft bearings 15 and 16 in the turbine unit 5, which becomes an obstacle in the air cycle refrigerating/cooling system, increase, and therefore, it becomes possible to put the air cycle refrigerating/cooling system into practice.

The bearings 15 and 16 are placed in the vicinity of the compressor rotor 6a and the turbine rotor 7a, respectively, so that the main shaft 13 is supported at both ends, and therefore, a more stable high rotation becomes possible. In addition, the bearing 15, which is a rolling contact bearing, is elastically supported by the second resilient element 26 so that an appropriate preload is applied, and therefore, the position of the main shaft 13 in the axial direction is stable, and the minute spaces d1 and d2 of the rotors 6a and 7a, respectively, are maintained without fail so that more stable rotation at high speed can be gained.

Non-contact seals 21 and 22 made up of a labyrinth seal are provided to the portions between the main shaft 13 and the spindle housing 14 on the end portion sides of the respective bearings 15 and 16, and therefore, air can be prevented from passing through the bearings 15 and 16 and leaking between the compressor 6 and the expansion turbine 7. The difference in the air pressure between the inside of the compressor 6 and the inside of the expansion turbine 7 is great, and therefore, air tends to leak after passing through the inside of the respective bearings 15 and 16 and along the surface where the inner and outer rings 15a and 16a of the respective bearings 15 and 16 make contact with the main shaft 13 and the spindle housing 14. This air leakage lowers the efficiency of the compressor 6 and the expansion turbine 7, and there is a risk that the air that passes through the bearings 15 and 16 may make the inside of the bearings 15 and 16 dirty, in the case where there is dust, and the lubricant inside the bearings dry, and thus, may lower durability. Such a reduction in the efficiency and dirtiness of the bearings 15 and 16 can be prevented by the above described non-contact seals 21 and 22.

As the preload is applied to the sensor 18, it becomes possible to detect movement of the main shaft 13 in either axial direction by means of the sensor 18, which can detect only pressing force. That is to say, in the case of a sensor for detecting pressing force, the pressing force cannot be detected in the case where it has a negative value, but the thrust force in the negative direction reduces the pressing force applied to the sensor 18 to which a preload is applied, and thus, detection becomes possible.

The first resilient element 25 for applying a preload to the sensor 18 has a greater spring constant than the second resilient element 26 for applying a preload to the bearings 15 and 16, and therefore, the preload applied to the sensor 18 makes detection both in the positive and negative direction possible, even though a preload is applied to the bearings 15 and 16.

Figure 3:
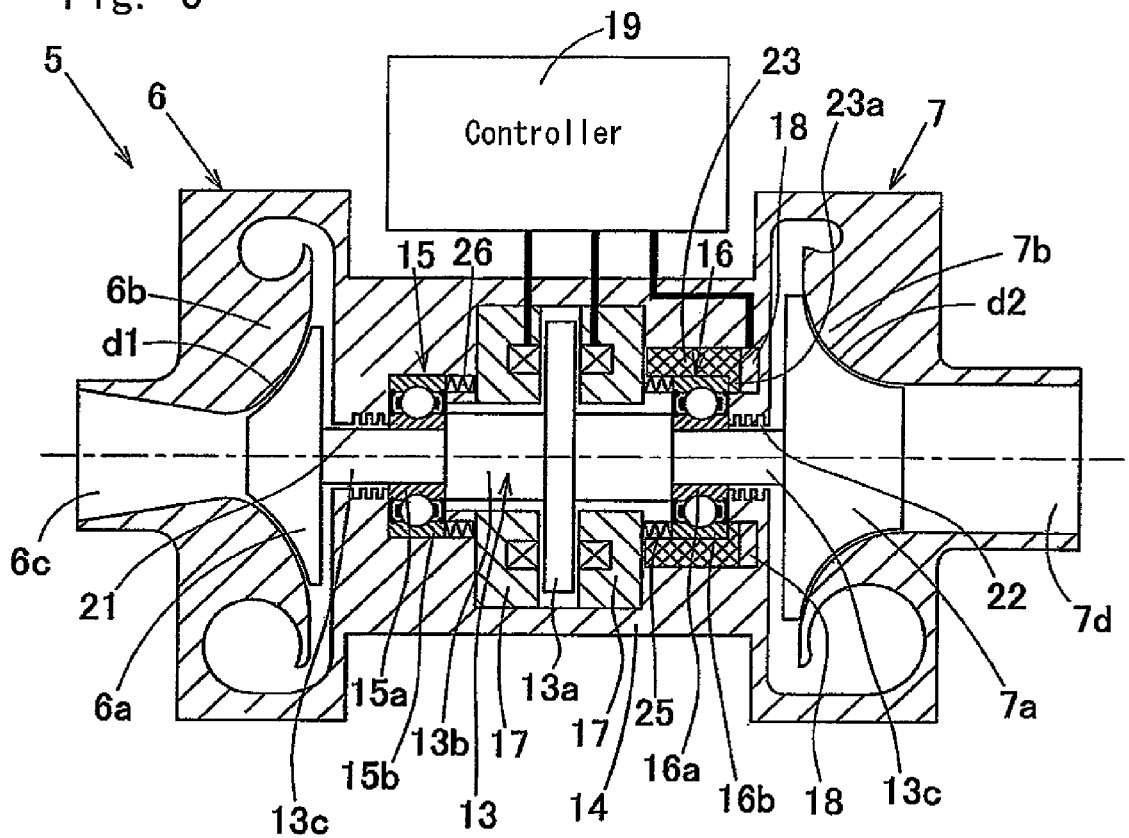
FIG. 3 is a cross sectional diagram showing the turbine unit for refrigerating/cooling air cycle according to the second embodiment of this invention.

The drawings of FIG. 3 and onwards show other embodiments according to this invention, and the details of the sensor 18. The configurations and the effects of the respective embodiments of FIG. 3 and onwards are the same as those of the embodiment of FIG. 2, except for the particularly described matters, and the same symbols are attached to the corresponding parts and the same descriptions are omitted.

FIG. 3 shows the second embodiment of this invention. In this embodiment the arrangement of the resilient elements 25, 26 and the sensor 18 is changed from that in the embodiment of FIG. 2. In this second embodiment, the bearing housing 23 to which the bearing 16 on the turbine rotor 7a side is fixed has a radially inwardly oriented flange or an inward flange 23a on the bearing axial end confronting the turbine rotor 7a, and the sensor 18 is disposed between the end face of the bearing housing 23 on the inward flange 23a side and the side face of the spindle housing 14 confronting this end face in the axial direction.

The first resilient element 25 is interposed between the outer ring 16a of the bearing 16 and the electromagnet 17, and a preload is applied to the sensor 18 via the outer ring 16a and the inward flange 23a of the bearing housing 23. The second resilient element 26 is interposed between the outer ring 15b of the bearing 15 on the compressor rotor 6a side and the electromagnet 17 to preload the bearing 15. Accordingly, the direction of the contact angle of the bearings 15 and 16 is opposite to that of the embodiment shown in FIG. 2.

In the case of the above configuration, the arrangement of the sensor 18 and the direction of the preload applied by the resilient elements 25, 26 are opposite to that of the embodiment shown in FIG. 2, but in this second embodiment as well, the sensor 18 is arranged in the vicinity of the bearing 16 so that the thrust force applied to the bearing 16 can be directly detected. In addition, the same effects as those explained in the embodiment of FIG. 2 can be obtained.

Figure 4:
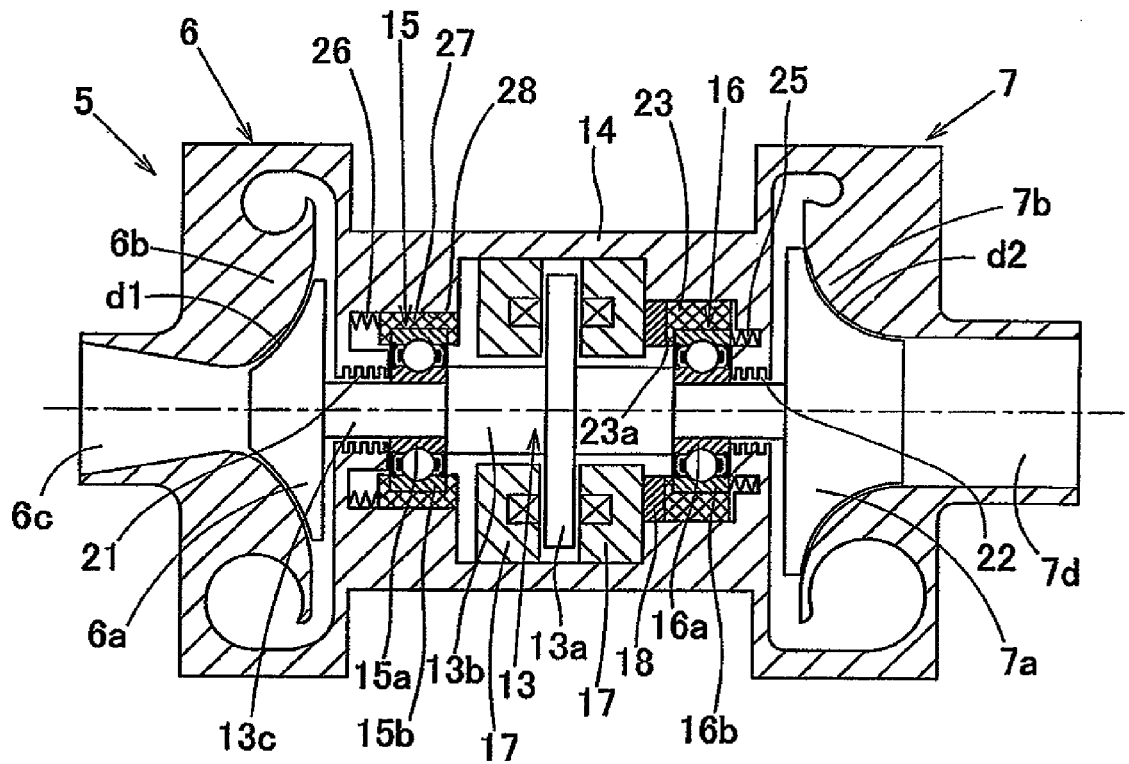
FIG. 4 is a cross sectional diagram showing the turbine unit for refrigerating/cooling air cycle according to the third embodiment of this invention.

In the third embodiment shown in FIG. 4, the outer ring 15b of the bearing 15 on the axial side where the sensor is not arranged is fixed to the inner periphery of a bearing housing 27, which is prepared as a separate member from the spindle housing 14. The bearing housing 27 has inward flanges respectively engaged with opposite end faces of the outer ring 15b, and is engaged in the inner diametric hole 28 provided in the spindle housing 14 moveably in the axial direction. The second resilient element 26 applies a preload to the outer ring 15b via the bearing housing 27.

Figure 5:
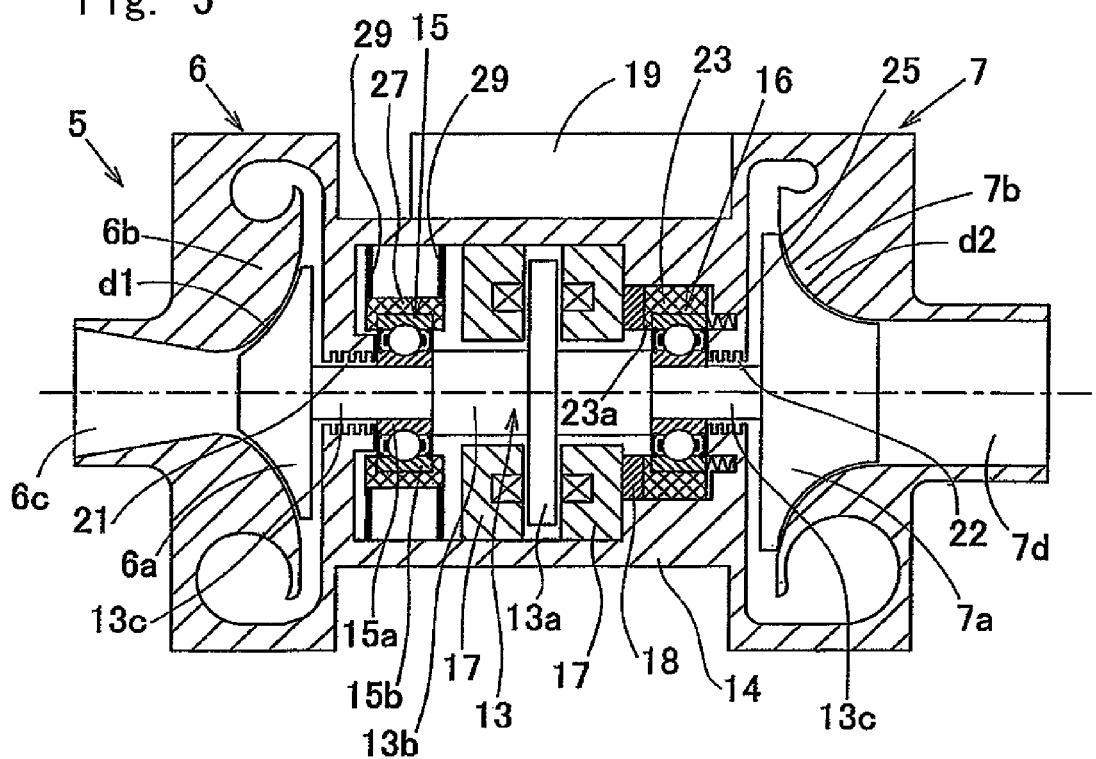
FIG. 5 is a cross sectional diagram showing the turbine unit for refrigerating/cooling air cycle according to the fourth embodiment of this invention.

In the fourth embodiment shown in FIG. 5, the bearing housing 27 for securing the outer ring 15b of the bearing 15 on the side where the sensor is not disposed is provided in the same manner as in the embodiment shown in FIG. 4 and the bearing housing 27 is supported to the spindle housing 14 by two leaf springs 29. The leaf springs 29 form the second resilient element for applying a preload to the bearing 15.

According to this feature, the leaf sprigs 29 work concurrently as a member for supporting the bearing housing 27 and as a member for applying a preload to the bearings 15 and 16, and therefore, the configuration is simplified. The leaf springs 29 are formed in plate form and have high rigidity in the radial direction, or the direction in the plane of the leaf springs, and therefore, the bearing 15 can be supported by the leaf springs 29. Here, two leaf springs 29 are disposed at a distance from each other in the axial direction, because it is difficult to stably support the bearing 15 with one leaf spring, due to a moment load affecting the bearing.

Figure 6:
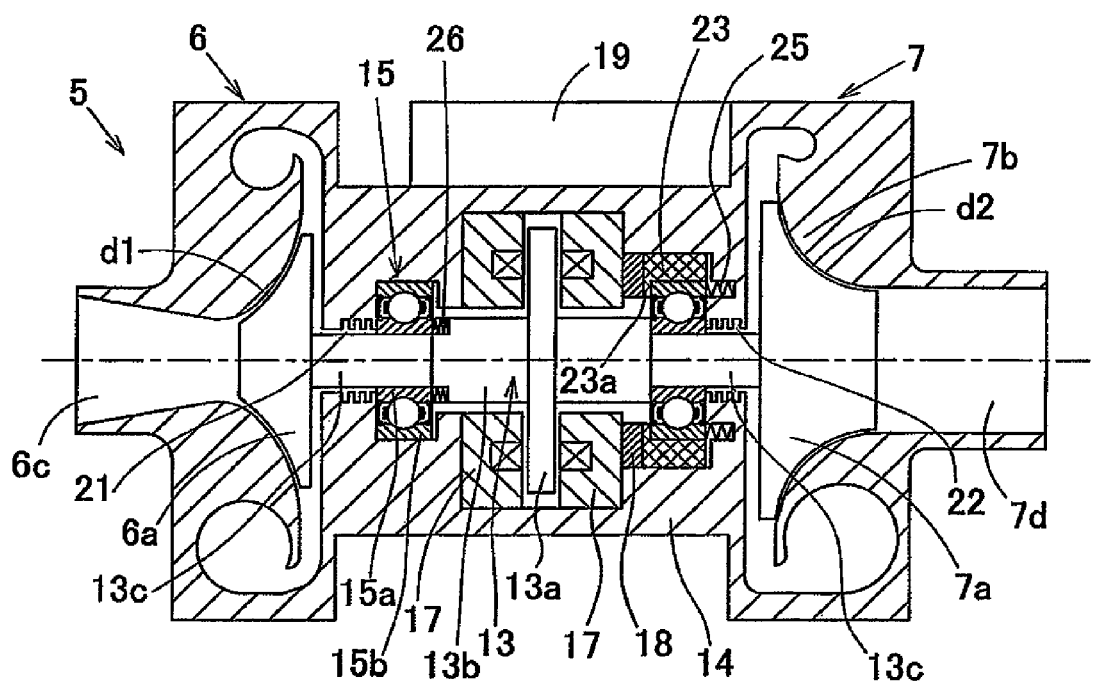
FIG. 6 is a cross sectional diagram showing the turbine unit for refrigerating/cooling air cycle according to the fifth embodiment of this invention.

The fifth embodiment shown in FIG. 6 is an example where the second resilient element 26, which applies a preload to the bearing 15 on the side where the sensor is not placed, in the same manner as in the example of FIG. 2, is provided on the rotating member. In this embodiment, the second resilient element 26 is arranged between the end face of the inner ring 15a and an axial end face of a step formed on the main shaft 13, confronting the end face of the inner ring 15a.

Figure 7B:
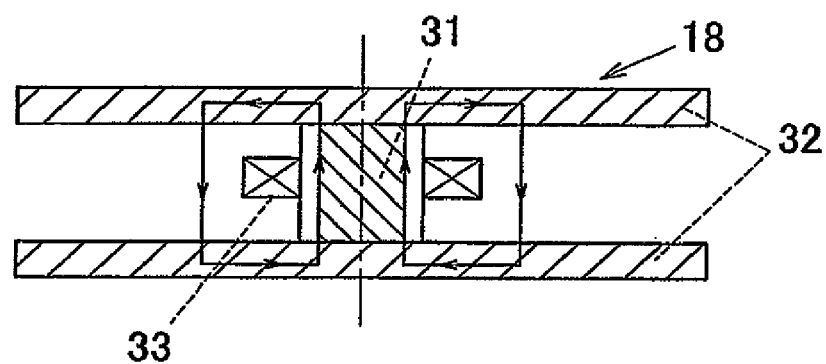
FIG. 7B is a cross sectional diagram along line VII-VII in FIG. 7A.
Figure 7A:
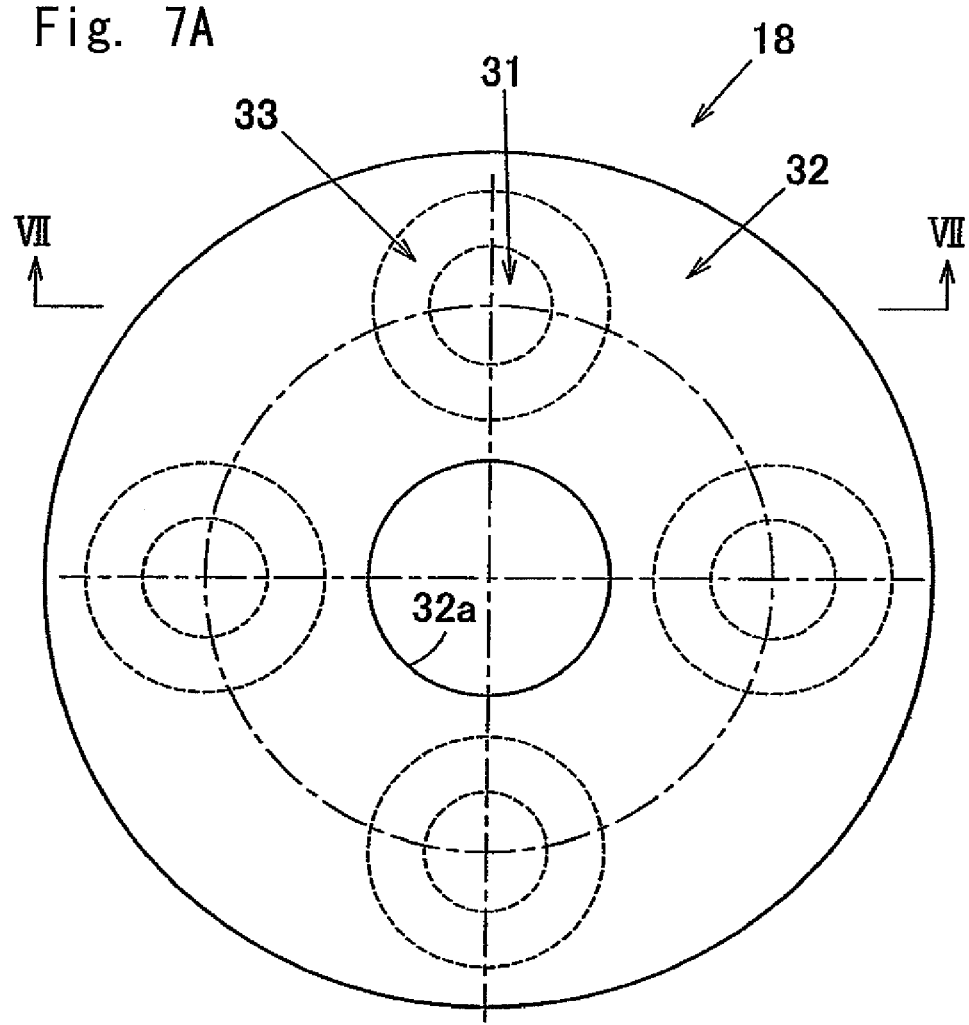
FIG. 7A is a front diagram showing an example of the sensor used in the turbine unit according to each of the above described embodiments.

FIGS. 7A and 7B show a specific example of the sensor 18 employed in the embodiment shown in FIG. 2. In this sensor 18, magnetostrictors 31 are sandwiched between two yolk members 32 made of a soft magnetic material, and a coil 33 for detecting the permeability is provided around the outer periphery of each magnetostrictor 31. The yolk members 32 are made of plate material in ring shape having a through hole 32a for the main shaft, and a plurality of sets of the magnetostrictor 31 and the coil 33 as that described above are arranged in the circumferential direction. The above described magnetostrictors 31 may be super magnetostrictors.

It is preferable for the number of magnetostrictors 31 to be two or more, in order to prevent inclination, and it is more preferable to be three or more. In this embodiment, four magnetostrictors are arranged at equal intervals in the circumferential direction.

According to the above sensor 18, the magnetic flux induced by the electric current flowing through the coils 3 is as shown by the arrow in FIG. 7B. When pressure is applied to the yolk members 32 as shown in FIGS. 7A and 7B due to the thrust force acting on the bearing 16 of FIG. 2, the permeability of the magnetostrictors 31 changes, and thus, the inductance also changes. This change in the inductance is detected by the coils 33 so that the above described thrust force can be detected.

In the case where a plurality of magnetostrictors 31 are provided around the main shaft as shown in FIG. 7A, the yolk members 32 are prevented from inclining so that the thrust force can be stably detected. In the case where the number of magnetostrictors 31 is three or more, the yolk members are more stable in terms of the inclination. In addition, coils 33 are connected in series with wires, for example, and thus, the thrust force acting on the entire periphery of the yolk members 32 can be detected and averaged.

Figure 8B:
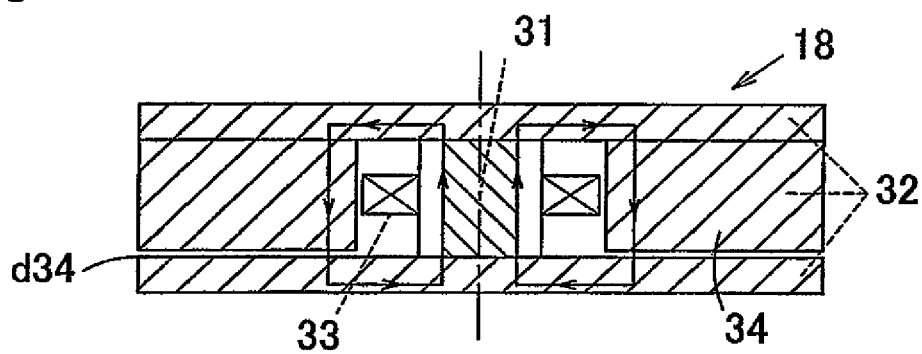
FIG. 8B is a cross sectional diagram along line VIII-VIII in FIG. 8A.
Figure 8A:
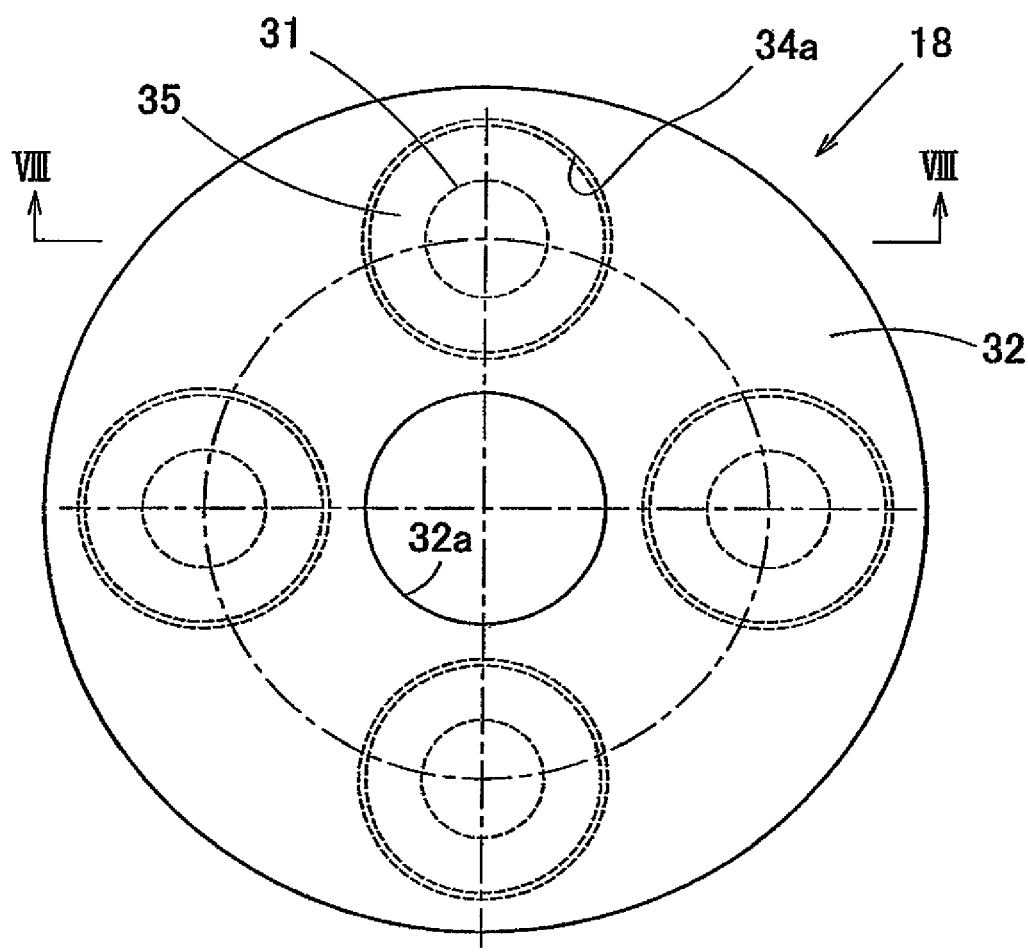
FIG. 8A is a front diagram showing the first modification of the sensor used in the turbine unit according to each of the above described embodiments.

As shown in the first modification of FIGS. 8A and 8B, a second yolk member 34, which is minutely shorter than the magnetostrictors 31 and made of a soft material, may be provided between the two yolk members 32 in the sensor 18 of FIGS. 7A and 7B. The second yolk member 34 is formed in ring shape, for example, as are the above described two yolk members 32, and has coil accommodating holes 34a in which the coils 33 are accommodated with a space in between. The second yolk member 34 is secured on, for example, one of the two yolk members 32. The above described magnetostrictors 31 may be super magnetostrictors. The space d34 resulting from the above described minute difference in length may have such a size that the load does not directly affect the area between the two yolk members 32, and may have a size of, for example, several tens of microns to several hundreds of microns.

When the second yolk member 34 is provided, as described above, the magnetic resistance of the magnetic path of the coils 33 is reduced, and thus the sensitivity of the sensor 18 increases.

Figure 9B:
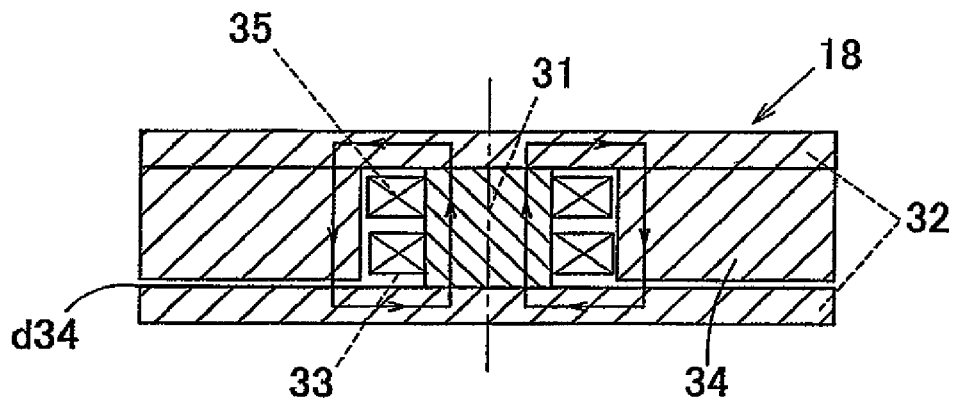
FIG. 9B is a cross sectional diagram along line IX-IX in FIG. 9A.
Figure 9A:
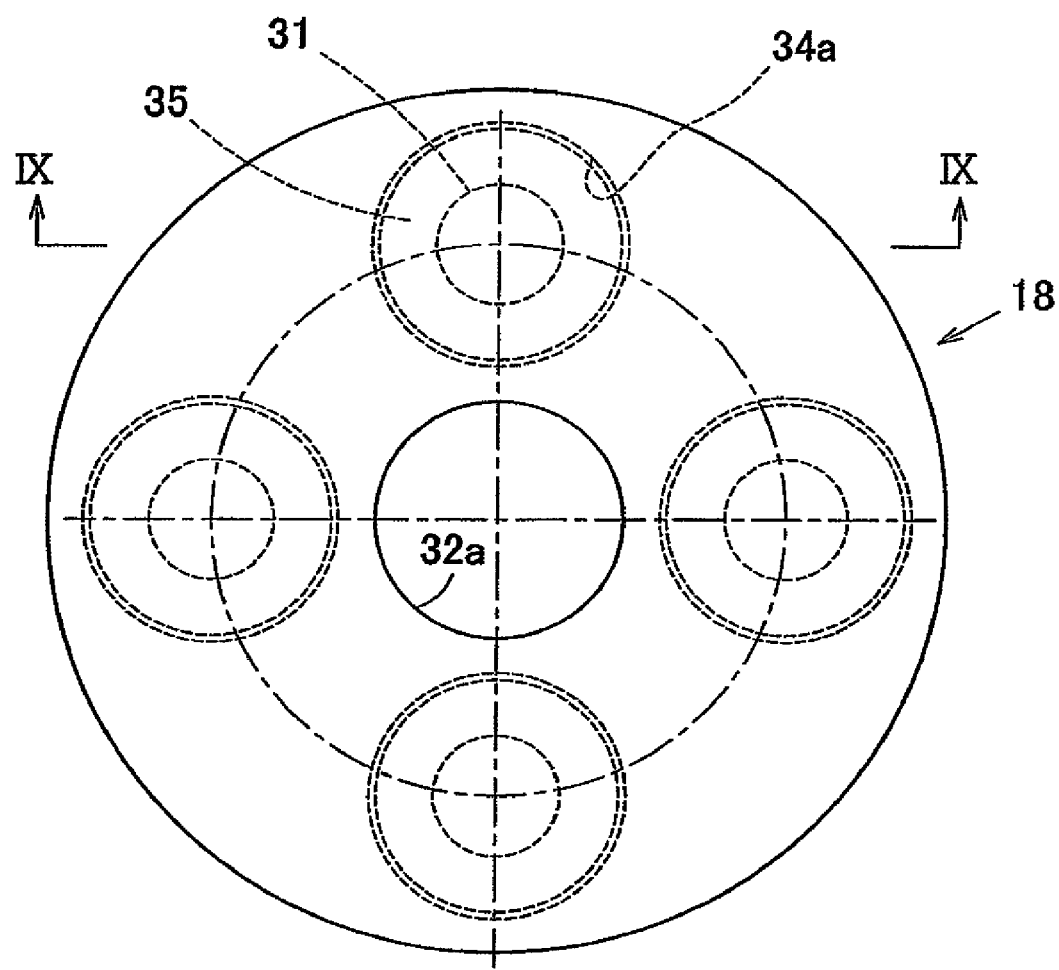
FIG. 9A is a front diagram showing the second modification of the sensor.

FIGS. 9A and 9B show the second modification, which includes, in addition to the coils 33 in the sensor 18 shown in FIGS. 8A and 8B, exciting coils 35 for providing carrier waves for conveying signals from the coils 33 for detecting the permeability of the magnetostrictors 31.

In the third modification of FIG. 10, permanent magnets 36 magnetized in the direction of the thickness, or in the axial direction, are provided in the sensor 18 shown in FIGS. 7A and 7B in direct contact with an end face of the magnetostrictors 31. The magnetostrictors 31 and the permanent magnets 36 are sandwiched between the two yolk members 32 made of a soft material.

According to the above permanent magnets 36, a bias magnetic field can be provided. Therefore, portions where change in the permeability is great in the magnetization curve of the magnetostrictors 31 can be selected and used for detecting the permeability, and thus, the sensitivity of detection can be enhanced. Alternatively, a portion where linearity of the change in the permeability is high in the magnetization curve may be used for detecting the permeability to make control easy.

Figure 10B:
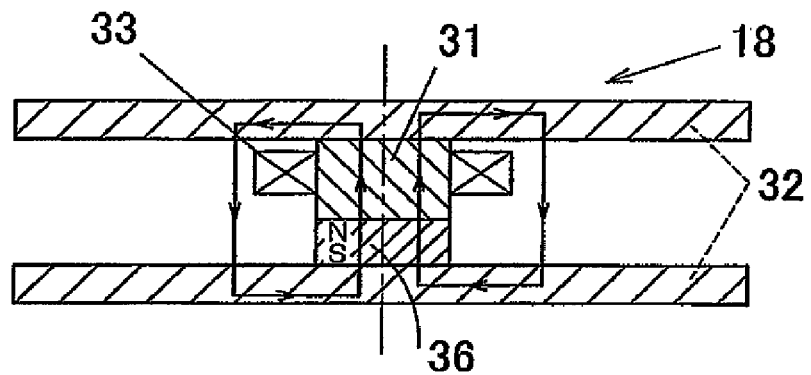
FIG. 10B is a cross sectional diagram along line X-X in FIG. 10A.
Figure 10A:
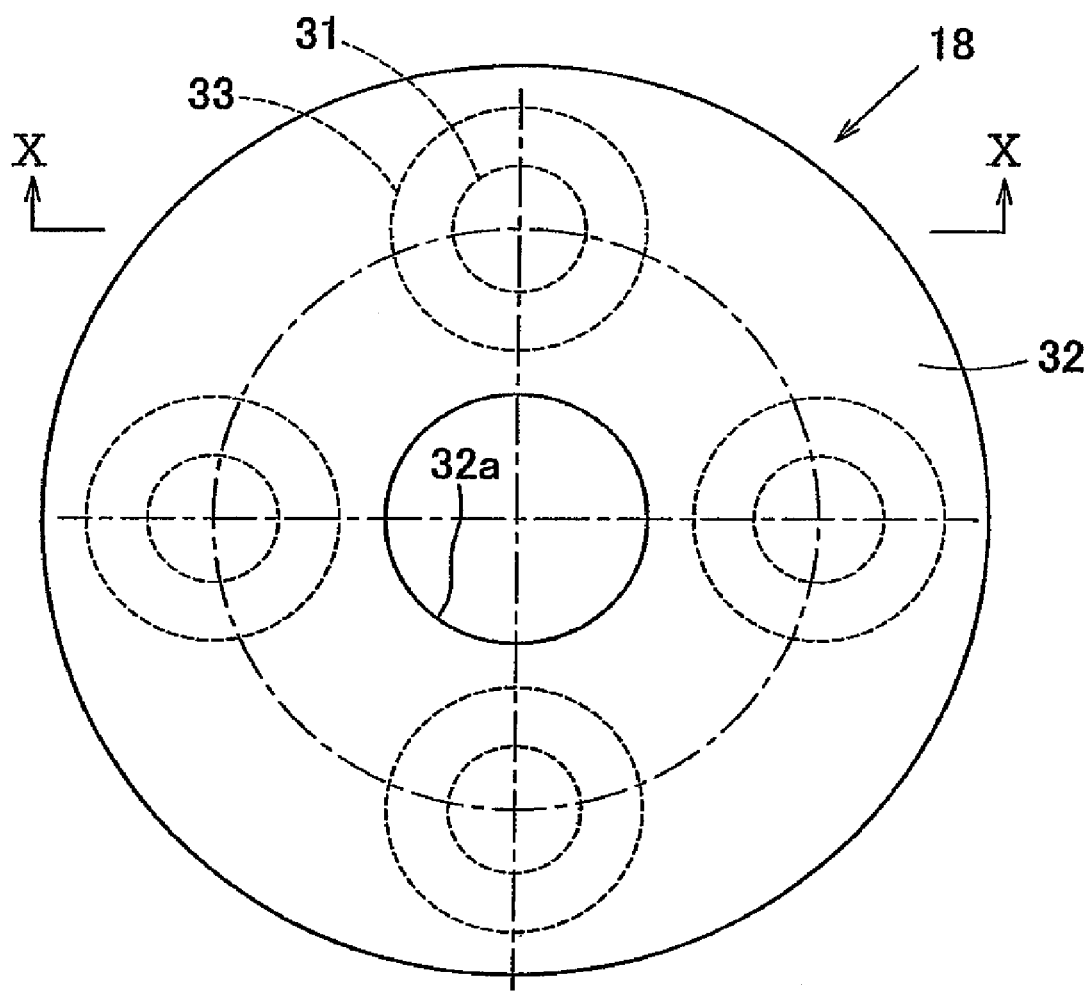
FIG. 10A is a front diagram showing the third modification of the sensor.
Figure 11B:
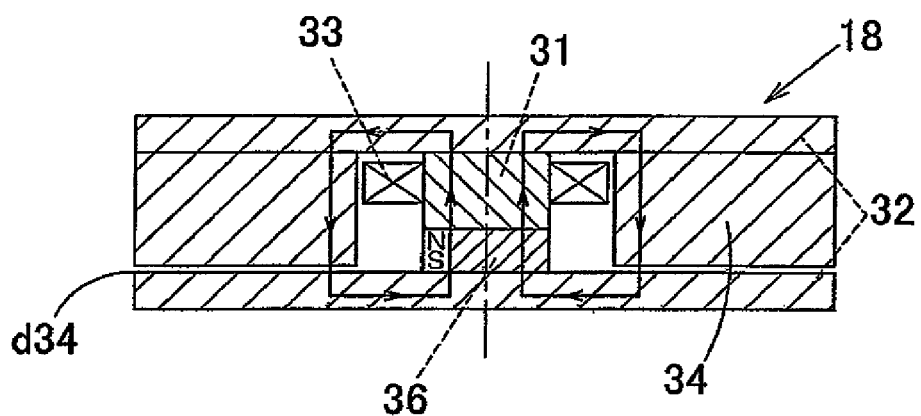
FIG. 11B is a cross sectional diagram along line XI-XI in FIG. 11A.
Figure 11A:
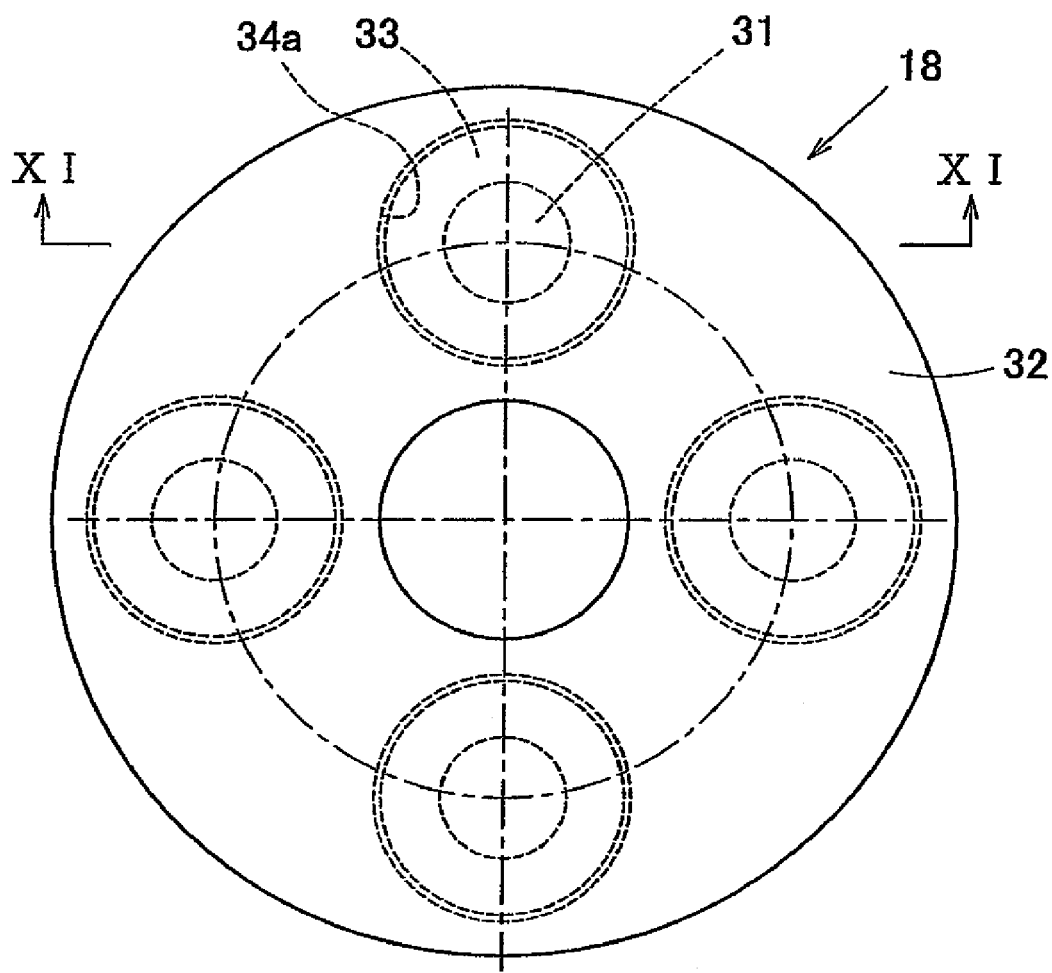
FIG. 11A is a front diagram showing the fourth modification of the sensor.

In the fourth modification of FIGS. 11A and 11B, a second yolk member 34 is provided in the sensor 18, where permanent magnets 36, as shown in FIGS. 10A and 10B, are provided in the same manner as in the example of FIGS. 8A and 8B.

Figure 12B:
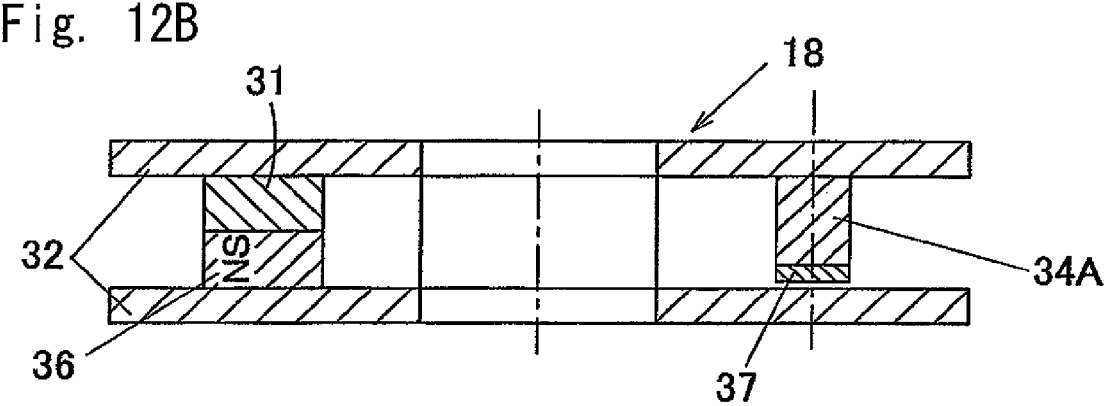
FIG. 12B is a cross sectional diagram along line XII-XII in FIG. 12A.
Figure 12A:
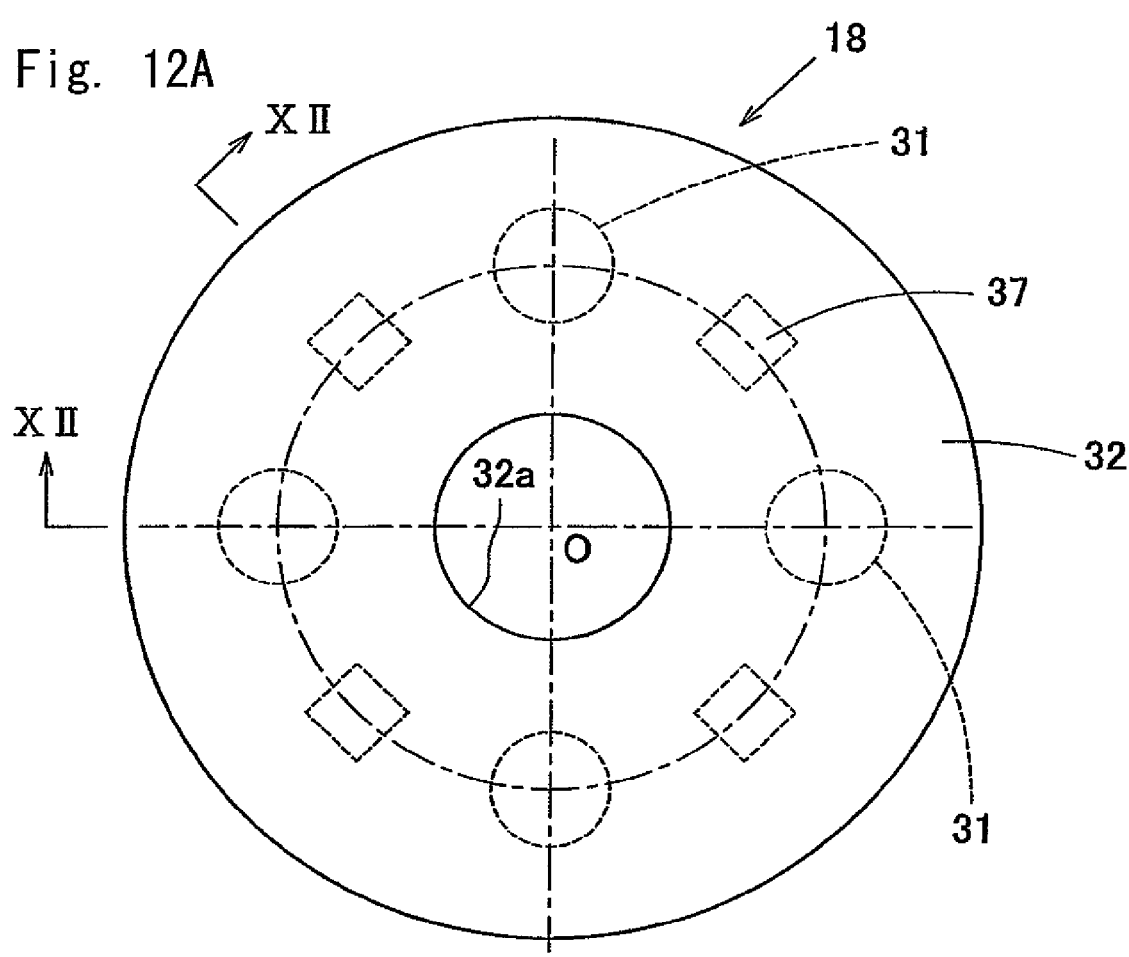
FIG. 12A is a front diagram showing the fifth modification of the sensor.

In the sensor 18 according to the fifth modification shown in FIGS. 12A and 12B, permanent magnets 36 magnetized in the direction of the thickness are provided in direct contact with an end face of the magnetostrictors 31, in the same manner as in the example of FIGS. 10A and 10B, and a plurality of magnetostrictors 31 and the permanent magnets 36 are sandwiched between two yolk members 32 made of a soft material at respective positions arranged in the circumferential direction. Here, in this modification, Hall elements 37 are employed as a device for detecting the permeability of the magnetostrictors 31 instead of coils. The Hall elements 37 are disposed between the magnetostrictors 31 aligned in the circumferential direction. One of the yolk members 32 and 32 is provided with second yolk members 34A and the Hall elements 37 are attached to one end of the respective second yolk members 34A with the other end thereof confronting the other of the yolk members 32 and 32.

According to this configuration, change in the permeability of the magnetostrictors 31 turns into change in the magnetic resistance in the magnetic circuit, and then change in the density of the magnetic flux passing through the Hall elements 37, and thus, change in the output of the Hall elements 37 can be detected. In this modification as well, since permanent magnets 36 generates the bias magnetic field, a portion where the output of the Hall elements 37 is largely changed in accordance with the change in the permeability of the magnetostrictors 31 can be used for detecting the output, and thus, increase in the sensitivity can be achieved.

Figure 13A:
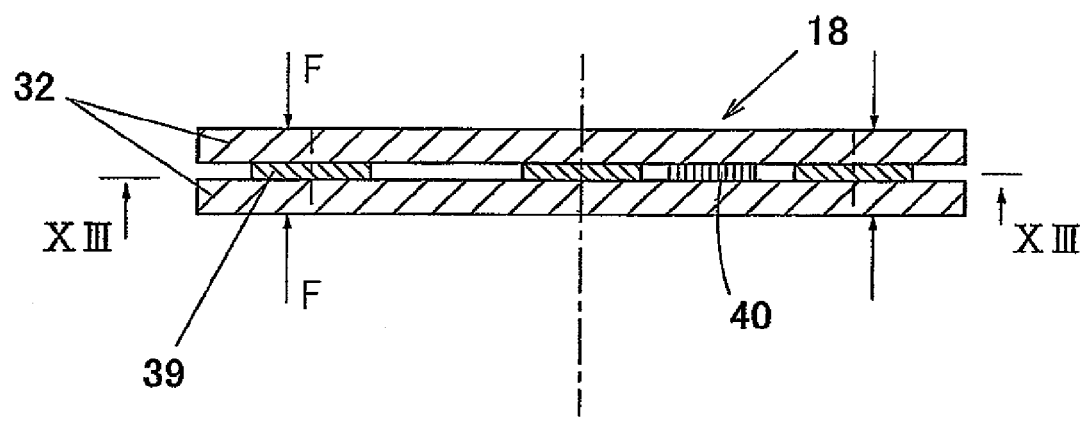
FIG. 13A is a cross sectional diagram showing the sixth modification of the sensor.
Figure 13B:
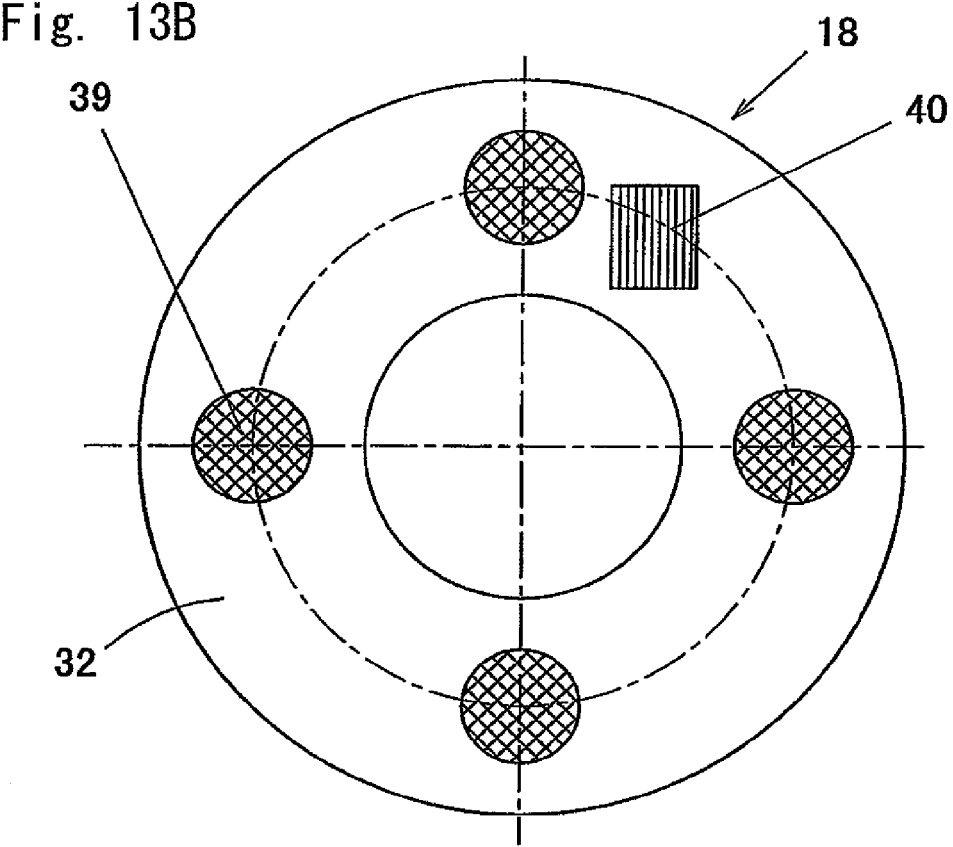
FIG. 13B is a diagram of the sensor as viewed along line XIII-XIII in FIG. 13A.

In the sensor 18 according to the sixth modification shown in FIGS. 13A and 13B, a plurality of pressure sensitive resistance elements 39 are interposed between two yolk members 32 at positions arranged in the circumferential direction. A temperature sensor 40 is attached to the yolk members 32 in the periphery of a pressure sensitive element 39 so that the resistance value of the pressure sensitive resistance elements 39 can be corrected on the basis of the output of the temperature sensor 40.

In the sensor 18 having this configuration, the resistance value of the pressure sensitive resistance elements 39 changes in accordance with the force F applied to the two yolk members 32. By detecting this change in the resistance value, the force F applied to the two yolk members 32 can be detected, so that the thrust force applied to the main shaft 13 in the turbine unit 5 of FIG. 2 can be detected.

Figure 14A:
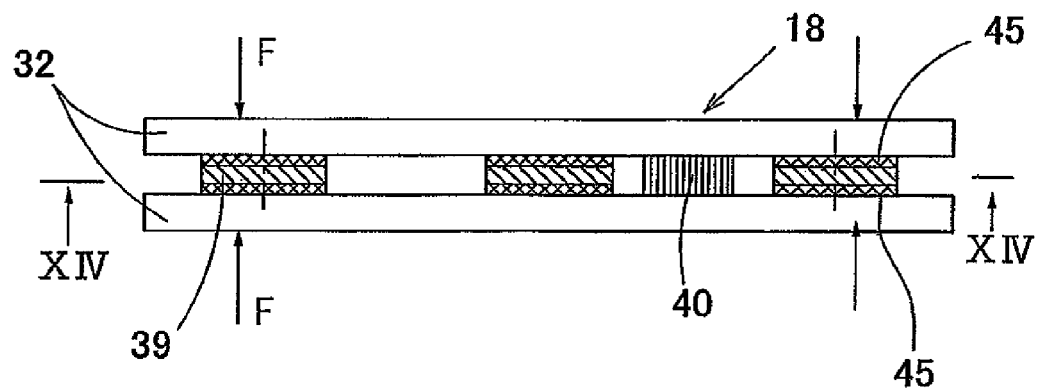
FIG. 14A is a cross sectional diagram showing the seventh modification of the sensor.
Figure 14B:
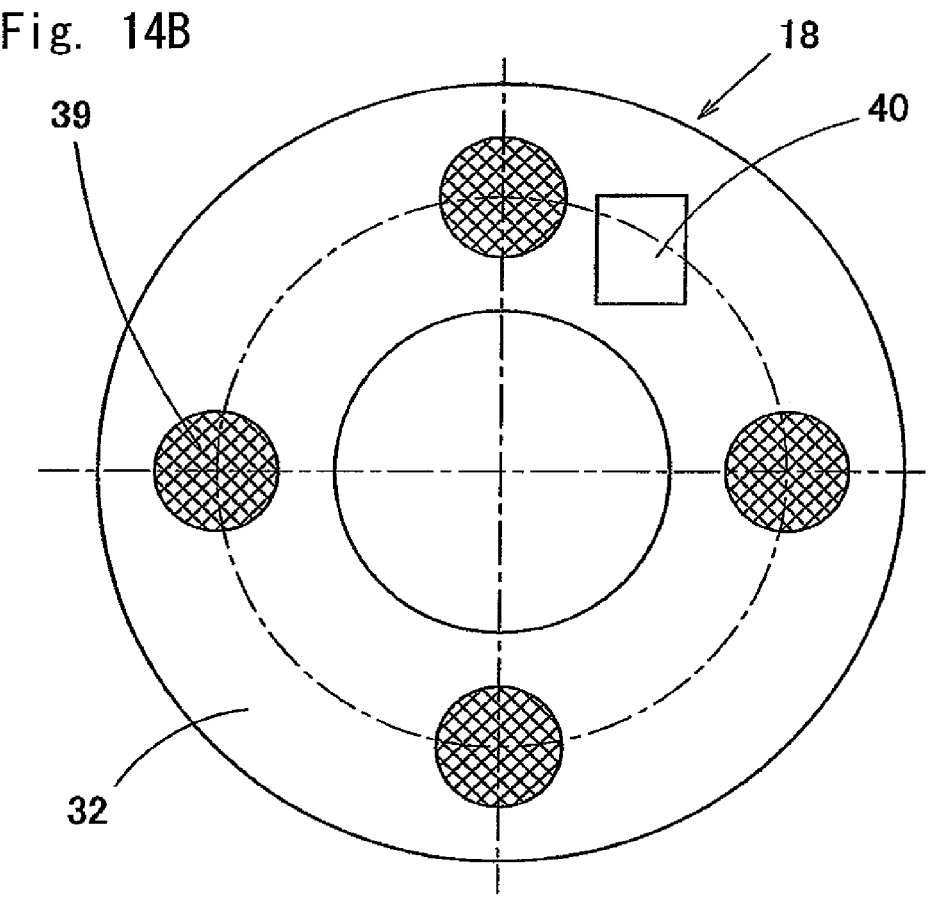
FIG. 14B is a diagram of the sensor as viewed along line XIV-XIV in FIG. 14A.

The sensor 18 according to the seventh modification shown in FIGS. 14A and 14B has elastic members 45 inserted between pressure sensitive resistance elements 39 shown in FIGS. 13A and 14B and yolk members 32. By inserting the elastic members 45, pressure is applied uniformly in the pressure receiving portions of the pressure sensitive resistance elements 39, and thus, errors in measurement resulting from pressure applied locally can be reduced.

Figure 15A:
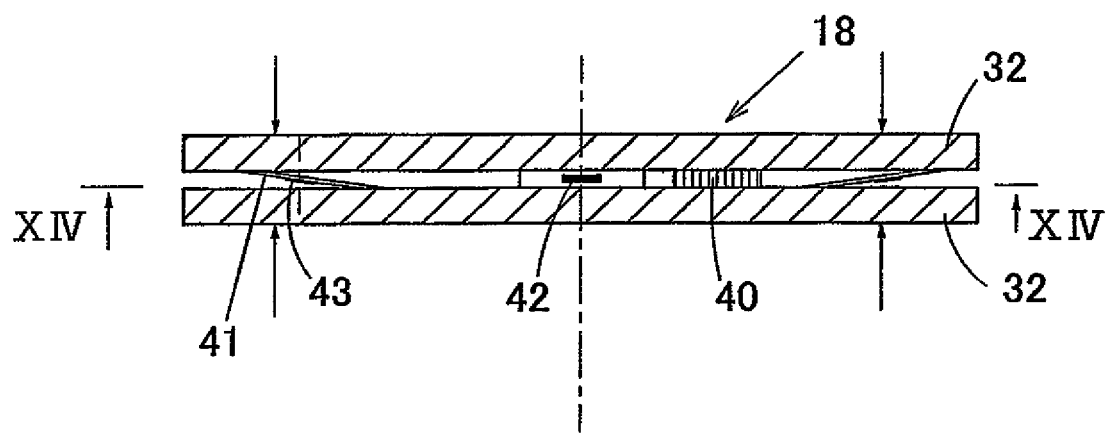
FIG. 15A is a cross sectional diagram showing the seventh modification of the sensor.
Figure 15B:
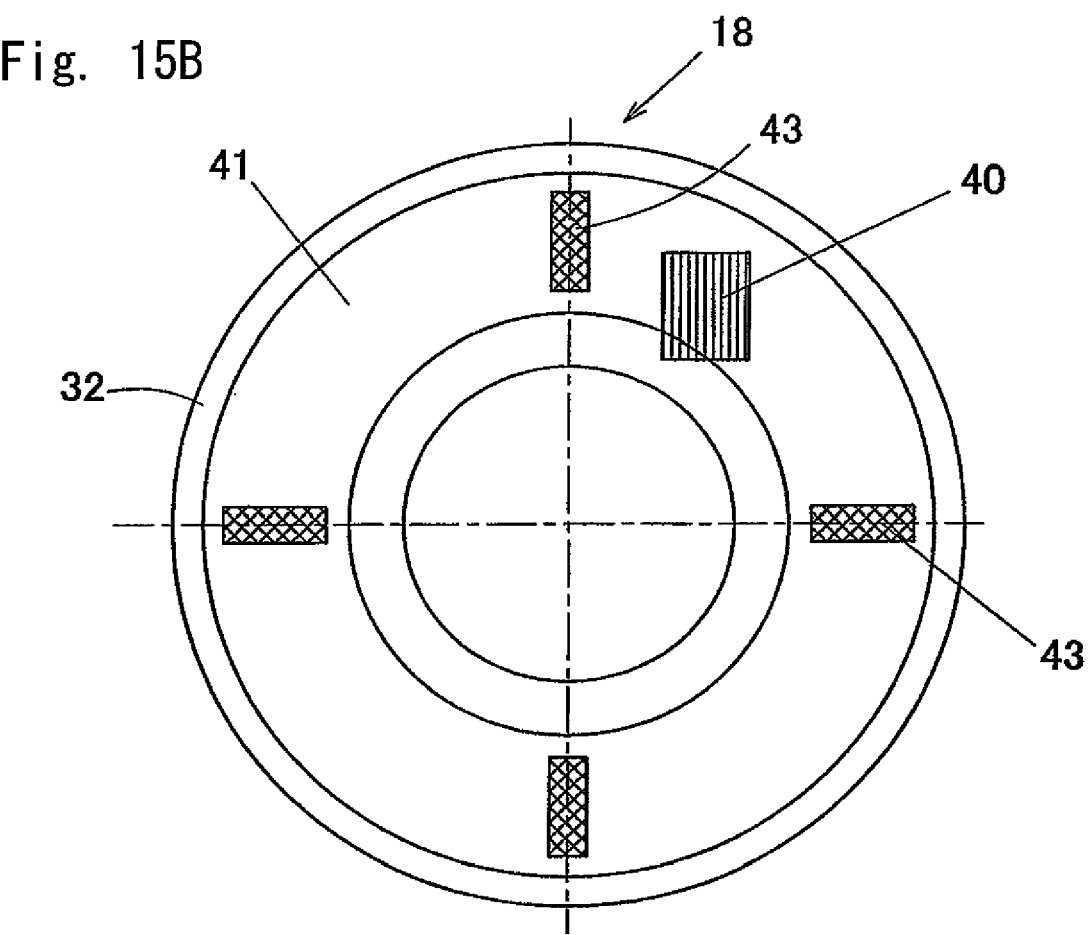
FIG. 15B is a diagram showing the sensor as viewed along line XV-XV in FIG. 15A.

In the sensor 18 according to the eighth modification shown in FIGS. 15A and 15B, a disc spring 41 concentric with two yolk members 32 is interposed between the yolk members 32, and a plurality of strain gauges 43 are attached to the disc spring 41 at positions aligned in the circumferential direction. In this modification, the temperature sensor 40 is attached to the yolk members 32 in the periphery of a strain gauge 43 so that the resistance value of the strain gauges 43 can be corrected on the basis of the output of the temperature sensor 40.

In the sensor 18 having this configuration, the disc spring 41 deflects or bends, due to the force F applied to the two yolk members 32, and this bending turns into change in the resistance value of the strain gauges 43. The change in the resistance value of the strain gauges 43 causes change in the output of a strain gauge amplifier, so that the value of the force F can be obtained.

FIGS. 16 to 24 respectively show examples of the sensor circuits and the sensor output of the above described sensors 18.

Figure 16:
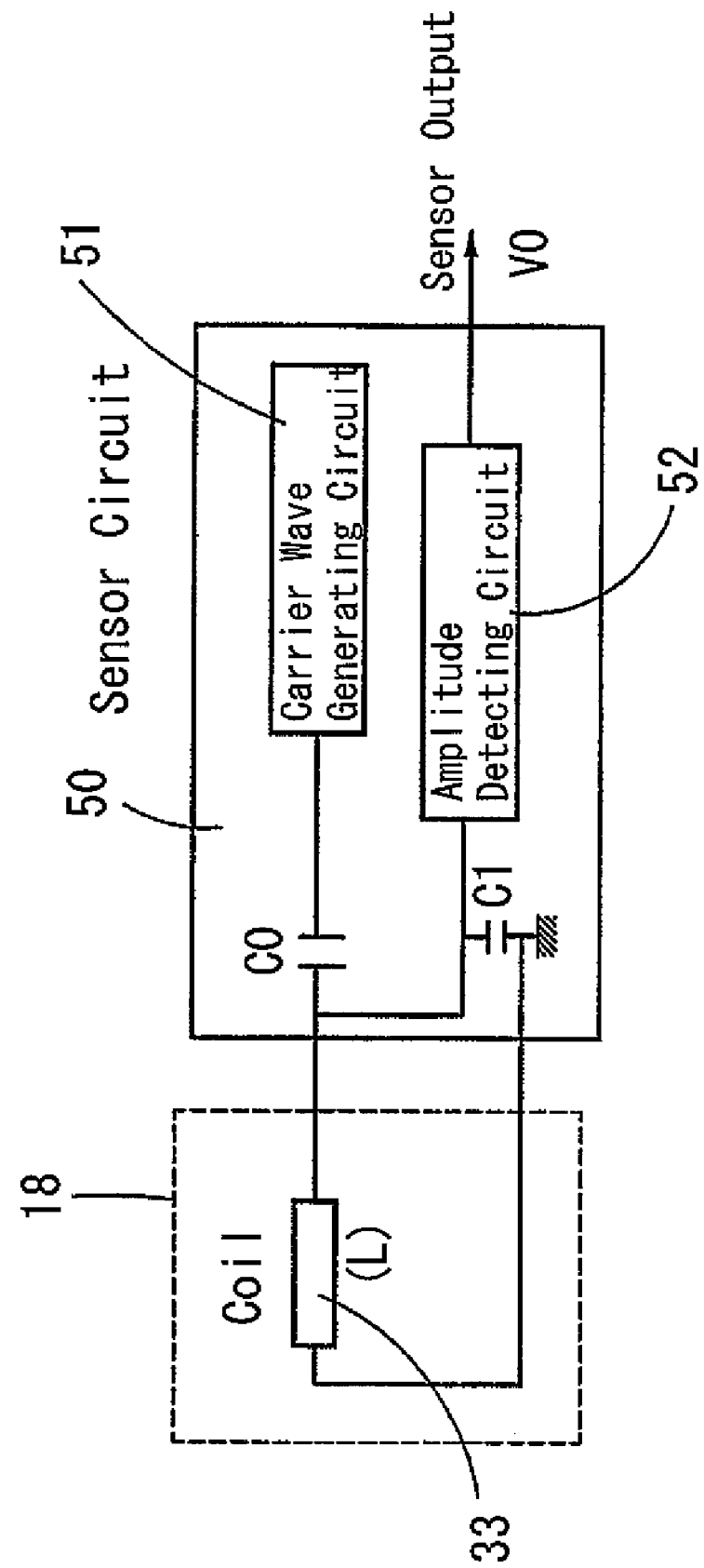
FIG. 16 is a block diagram showing an example of the sensor circuit used in the turbine unit according to each of the above described embodiments.

FIG. 16 shows an example of a sensor circuit 50 for the sensor 18 where coils 33 are provided, such as shown in FIGS. 7A and 7B. This sensor circuit 50 generates a carrier wave having a constant amplitude and a constant frequency in a carrier wave generating circuit 51, and transmits the carrier wave to the coils 33 via condensers Co. The coils 33 form a parallel resonant circuit with condensers C1, and the output of this parallel resonant circuit is supplied to an amplitude detecting circuit 52.

In the above described resonant circuit, the value of a transfer function eo/ei changes in accordance with the input frequency f where eo and ei represent an input and an output of the resonance circuit, respectively. The above described transfer function eo/ei has a peak value, $1/(2\pi\sqrt{LC})$, where L and C represent an inductance of the coils 33 and a capacitance of the condenser C1. The permeability of the magnetostrictors 31 (FIG. 7A) changes in accordance with the force F as described above, and therefore, the value of the inductance L of the coils 33 changes in accordance with this change. Accordingly, a voltage having a constant amplitude and a constant frequency is applied by means of the carrier wave generating circuit 51 so as to excite the above described resonant circuit, and thus, the value of the transfer function eo/ei for a predetermined frequency changes in accordance with change in the force F, that is, change in the inductance L. The amplitude detecting circuit 52 detects this change in the transfer function eo/ei to supply a sensor output Vo.

Figure 17:
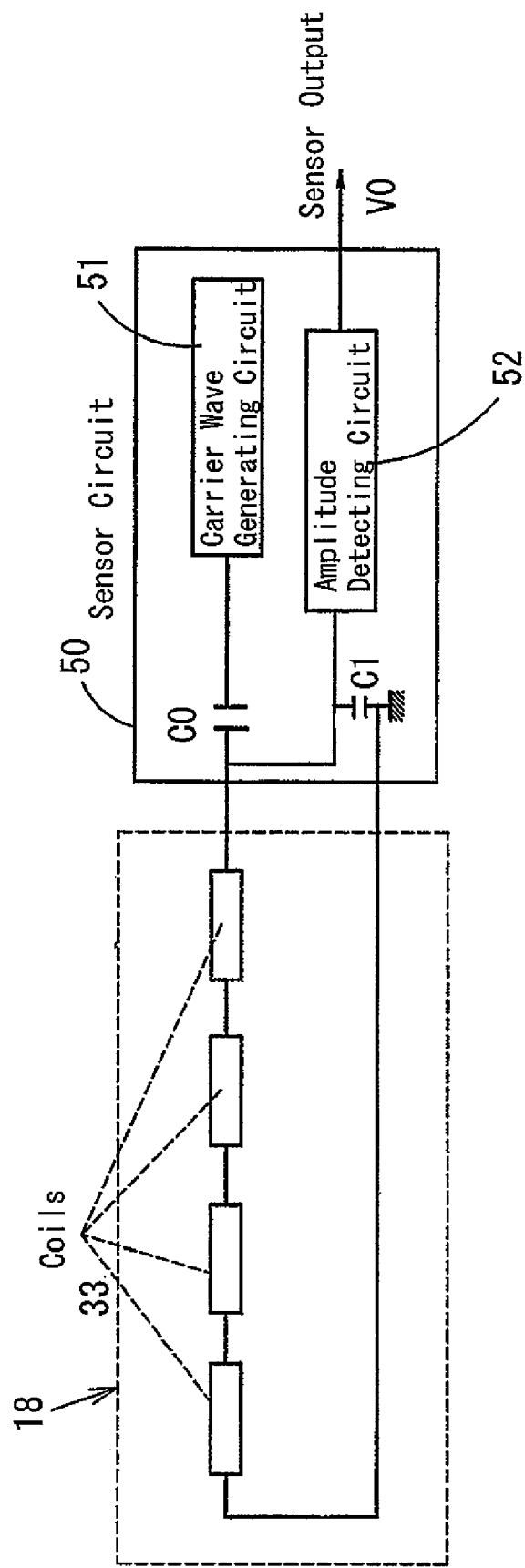
FIG. 17 is a block diagram showing the first modification of the sensor circuit.

In the case where a plurality of coils 33 are arranged, as shown in FIG. 7B, the sensor circuit 50 may be provided for each coil 33, or the coils 33 may be connected in series, as shown in the first modification shown in FIG. 17, so that single sensor circuit 50 can detect the inductance of the coils 33. Generally, neighboring coils 33 are wound in different directions. Accordingly, by connecting the coils 33 in series as described above, the force applied to the magnetostrictors 31 by the respective coils 33 is averaged and outputted as the sensor output Vo.

Figure 18A:
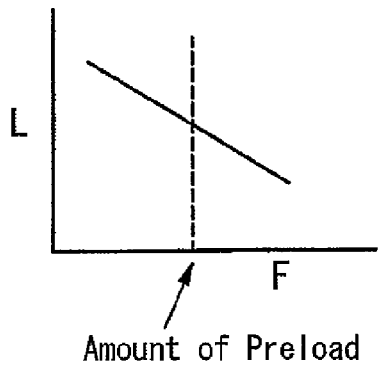
FIG. 18A is a graph showing the relationship between the force and the inductance in the sensor circuit.
Figure 18B:
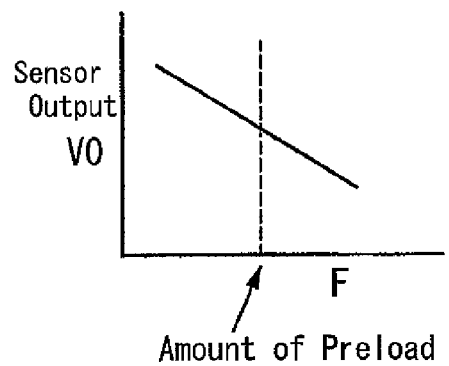
FIG. 18B is a graph showing the relationship between the force and the sensor output in the sensor circuit.

The relationship between the force F applied to the magnetostrictors 31 and the inductance L, as well as the relationship between the above described force F and the sensor output Vo in these sensor circuits 50 of FIGS. 16 and 17 are shown in FIGS. 18S and 18B. In this case, application of force in the negative direction represents that members in contact with the magnetostrictors 31 (FIG. 7A) move away from the magnetostrictors 31, making it impossible to detect the force, and therefore, a preload is initially applied as shown in FIGS. 18A and 18B, so that the thrust force can be detected through the difference between the sensor output detected and the initial sensor output with the preload, whichever direction, positive or negative, the above described thrust force is applied in.

Figure 19:
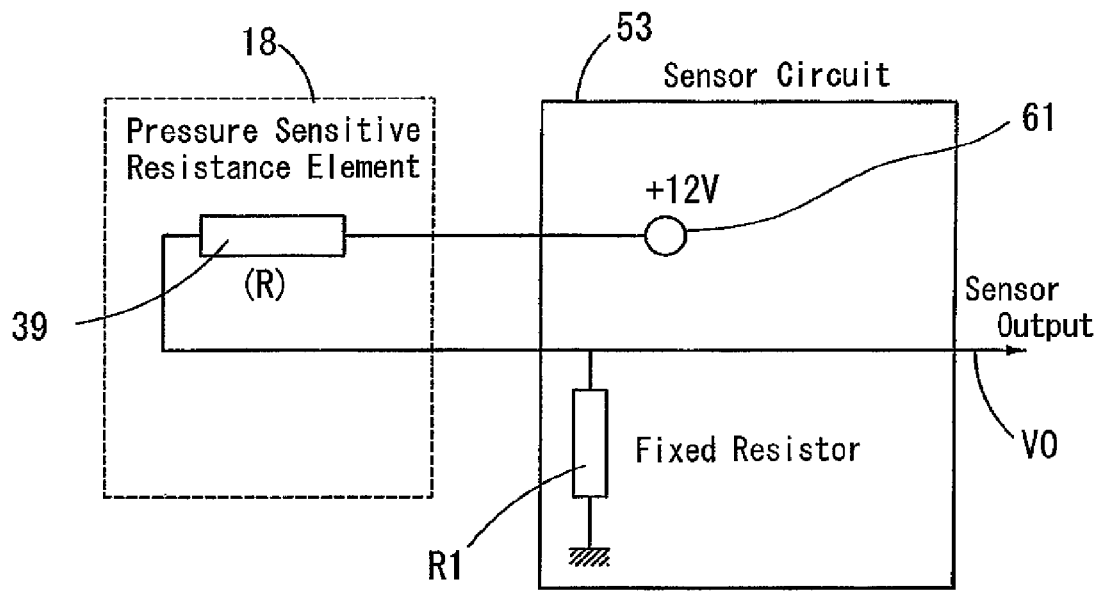
FIG. 19 is a block diagram showing the second modification of the sensor circuit.
Figure 20A:
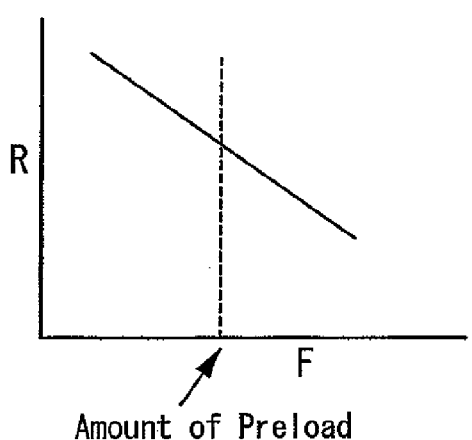
FIG. 20A is a graph showing the relationship between the force and the resistance value in the sensor circuit.
Figure 20B:
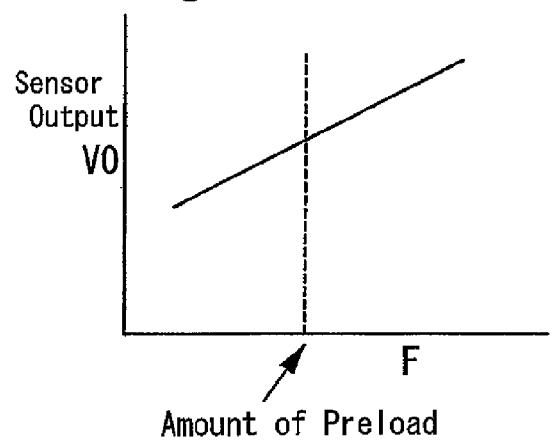
FIG. 20B is a graph showing the relationship between the force and the sensor output in the sensor circuit.

FIGS. 19, 20A and 20B show the second modification of the sensor circuit 53 in the sensor 18 having the pressure sensitive resistance elements 39 of FIGS. 13A and 13B. In this sensor circuit 53, the series circuit of the pressure sensitive resistance elements 39 and fixed resistors R1 is connected to the power supply 61 so that the sensor output Vo can be outputted through a connection point between the pressure sensitive resistance element 39 and the fixed resistor R1, which is at an intermediate portion of this series circuit.

As shown in FIG. 20A, the resistance R of the pressure sensitive resistance elements 39 decreases in proportion to the applied force F. Accordingly, resistance division ratio in the series circuit increases and as a result, the sensor output Vo increases in proportion to the force F increases, as shown in FIG. 20B.

Application of force in the negative direction represents that members in contact with the pressure sensitive resistance elements 3 move away from the pressure sensitive resistance elements 39, making it impossible to detect the negative force, and therefore, a preload is initially applied as shown in FIGS. 20A and 20B, so that the force F can be detected through the difference between the sensor output detected and the initial sensor output with the preload, whichever direction, positive or negative, the force F is applied in.

Figure 21:
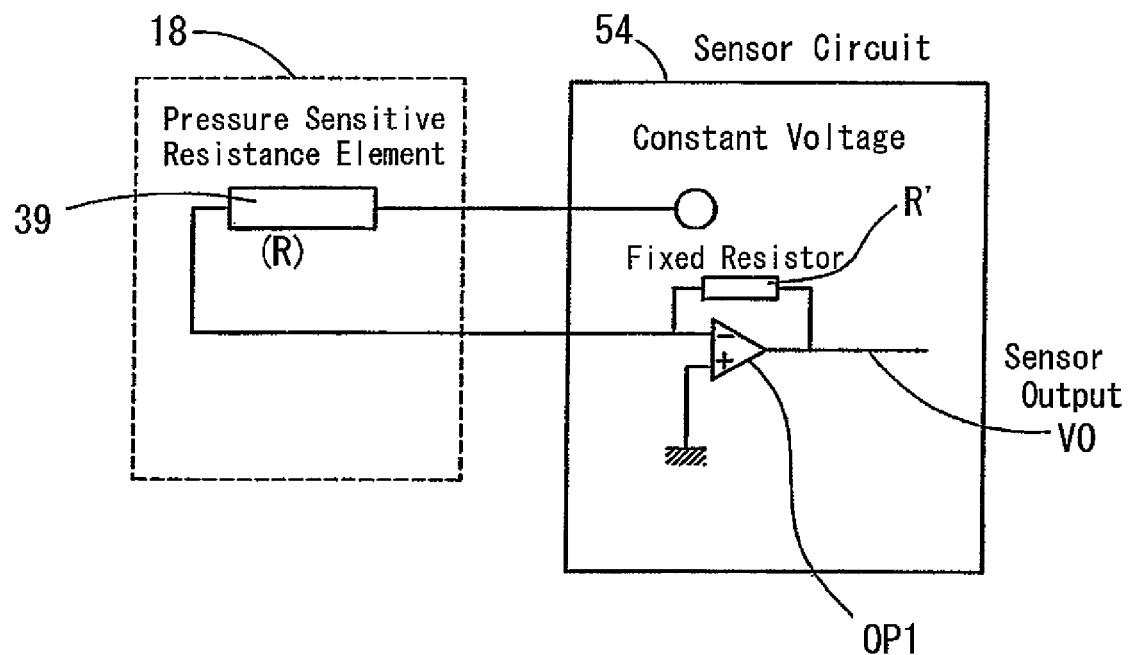
FIG. 21 is a block diagram showing the third modification of the sensor circuit.

FIG. 21 shows the third modification of the sensor circuit 54 in the sensor 18 having the pressure sensitive resistance elements 39 of FIGS. 13A and 13B. This sensor circuit 54 includes an operational amplifier OP and a fixed resistor R' connected between an inverse input terminal and the output terminal of the operational amplifier OP1, and the pressure sensitive resistance elements 39 has one end connected to the inverse input terminal, and a constant voltage V is supplied at the other end.

Figure 22:
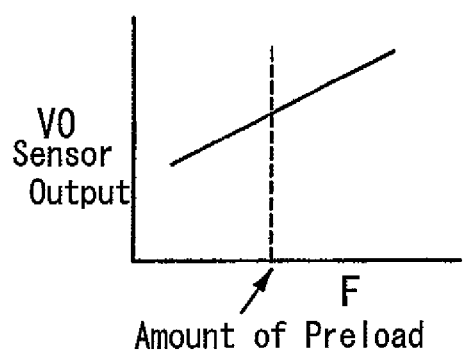
FIG. 22 is a graph showing the relationship between the force and the sensor output in the sensor circuit.

In this sensor circuit 54, the sensor output Vo is $-R'/R \times Vi$ when the resistance of the pressure sensitive resistance elements is R. Accordingly, as shown in FIG. 22, the sensor output Vo increases in proportion to the force F applied to the pressure sensitive resistance elements 39.

Figure 23:
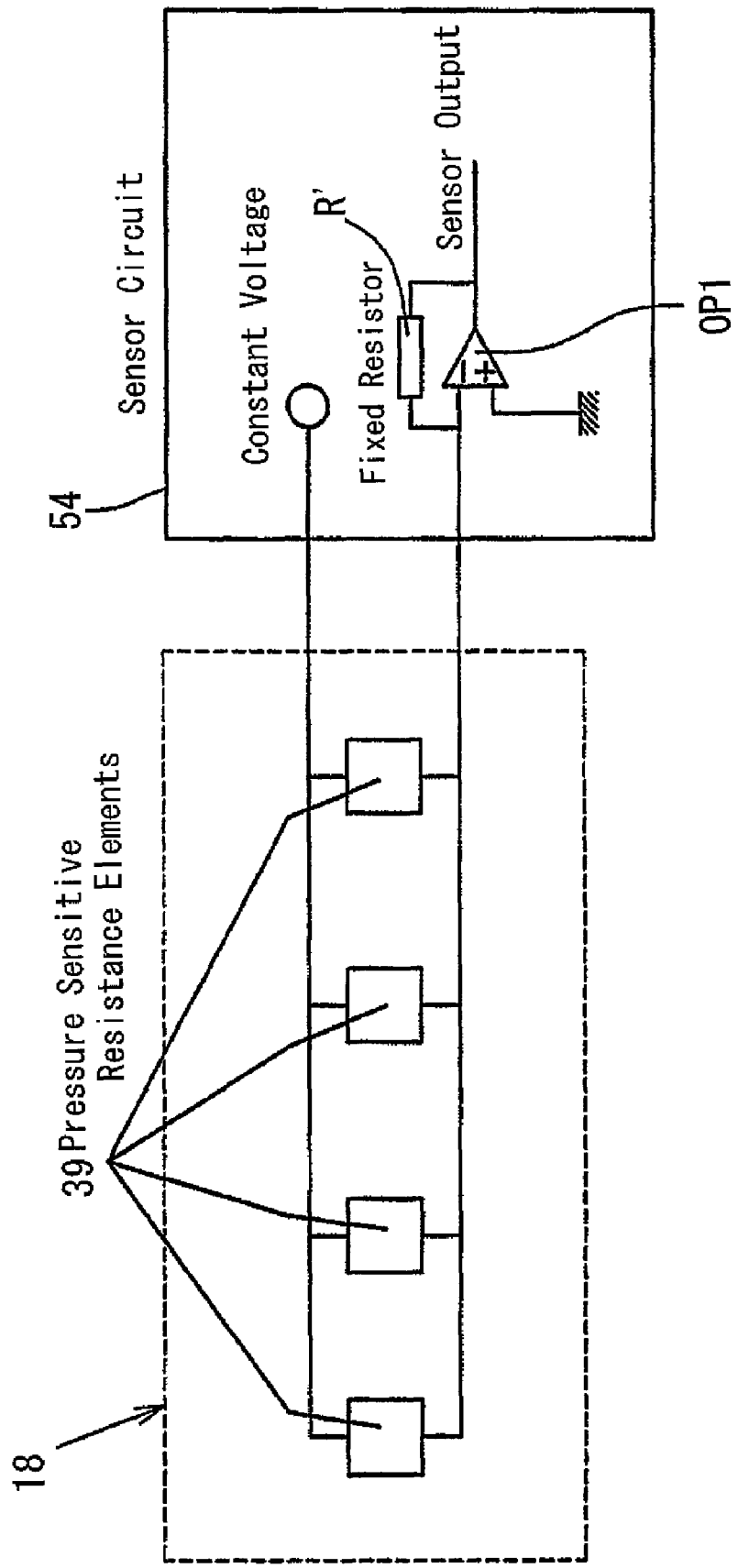
FIG. 23 is a block diagram showing the fourth modification of the sensor circuit.

In the case where a plurality of pressure sensitive resistance elements 39 are employed as shown in the example of FIGS. 13A and 13B, the sensor circuit 54 may be provided for each pressure sensitive resistance element 39, or the pressure sensitive resistance elements 39 may be connected in parallel and connected between the operational amplifier OP1 and the power supply, as shown in the fourth modification of FIG. 23, so that single sensor circuit 54 can detect the force F. In this case, the force F applied to the pressure sensitive resistance elements 39 is averaged and outputted as the sensor output Vo.

Figure 24:
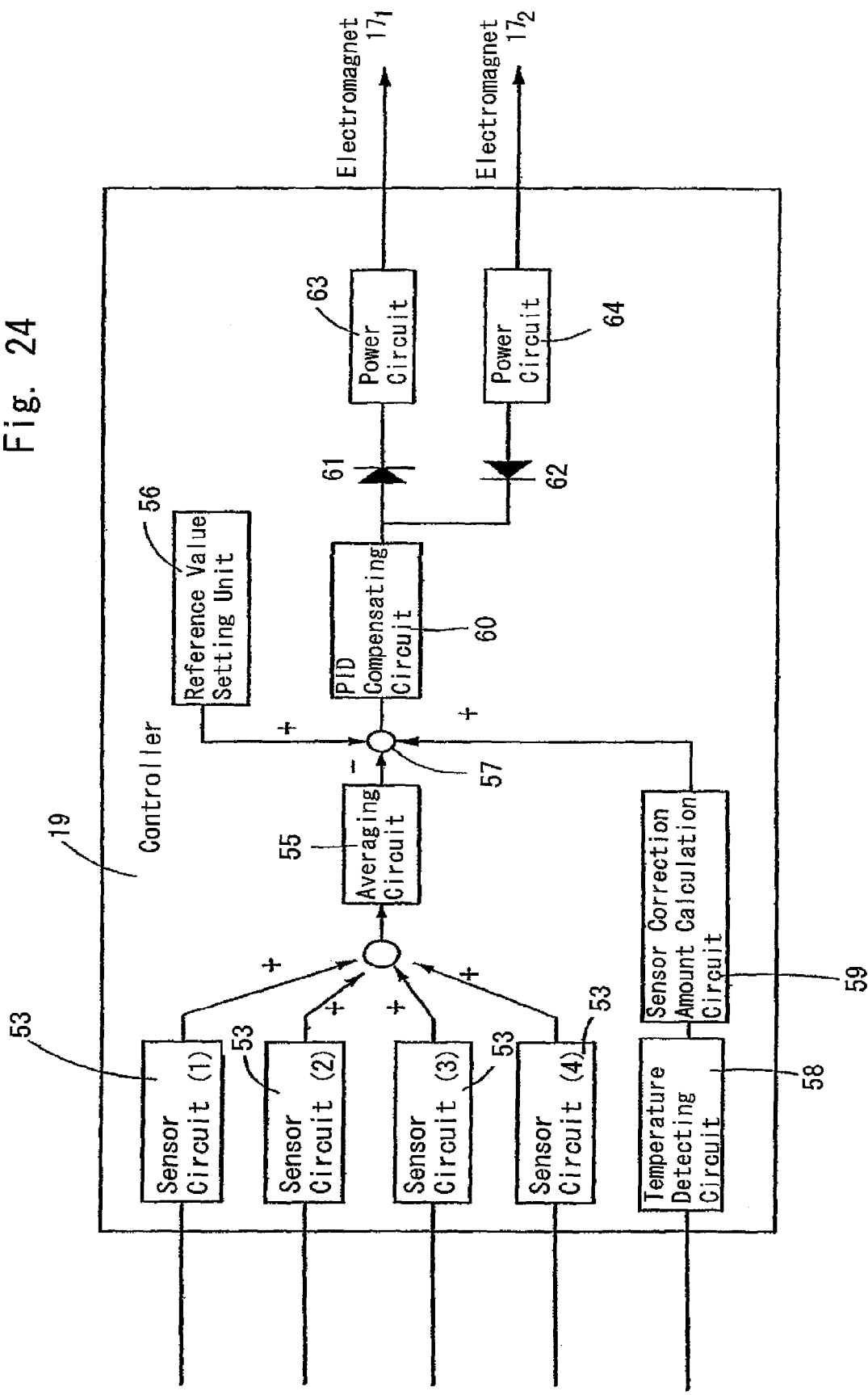
FIG. 24 is a block diagram showing an example of the controller used in the turbine unit according to each of the above described embodiments.

FIG. 24 shows a specific example of the configuration of the controller 19 shown in FIG. 2. This controller 19 is an example of a case where a sensor circuit 53 is provided for each pressure sensitive resistance element 39, for example as shown in FIGS. 13A and 13B. Symbols with parentheses indicated in each sensor circuit 53 denote four separate sensor circuits 53. The sensor circuits 53 shown in FIG. 24 may be used for the coils 33 such as shown in FIG. 7A.

The output from the respective sensor circuits 53 is arithmetically averaged by an averaging circuit 55 and compared with a reference value set by a reference value setting unit 56 in a comparing circuit 57, so that the deviation thereof can be obtained. The reference value corresponds to, for example, the amount of set preload. A temperature value detected by the temperature sensor 40 in FIG. 13A is, for example, inputted into a sensor correction amount calculation circuit 59 via a temperature detecting circuit 58, so that the sensor correction amount calculation circuit 59 outputs a correction value in accordance with the temperature value. This correction value is added to the above described deviation in the comparing circuit 57.

The deviation after the temperature correction is inputted to and processed in a PID compensating circuit 60 by means of proportion, differentiation and integration operations, which are appropriately set depending on the properties of the turbine unit 5.

The output of the PID compensating circuit 60 is inputted into power circuits 63, 64 for driving electromagnets $17_1$, $17_2$ one for each direction via diodes 61, 62. The electromagnets $17_1$, $17_2$ are a pair of electromagnets 17 confronting the thrust plate 13a shown in FIG. 2 and exert only attract force against the thrust plate, and therefore, the direction of the electric current is determined by the diodes 61, 62 in advance, so that the two electromagnets $17_1$, $17_2$ are selectively driven.

Figure 25A:
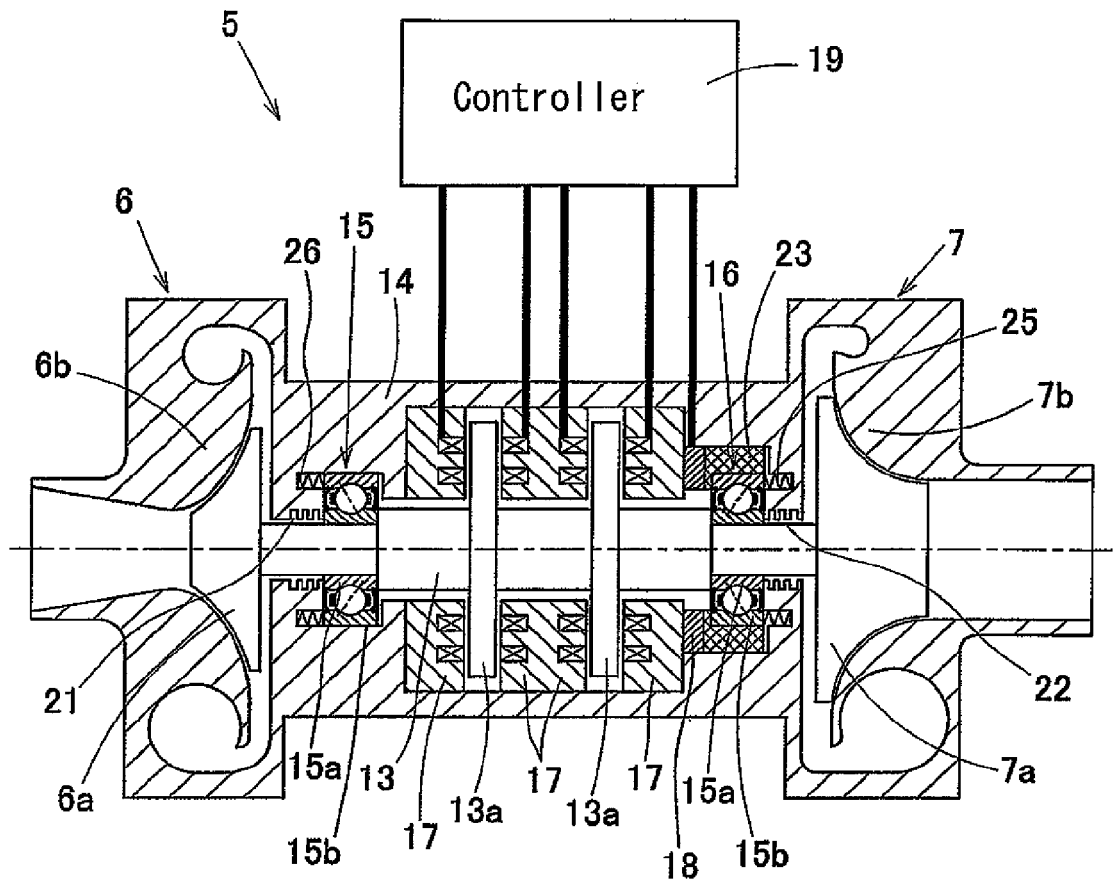
FIG. 25A is a longitudinal cross sectional diagram showing the turbine unit for refrigerating/cooling air cycle according to the sixth embodiment.
Figure 25B:
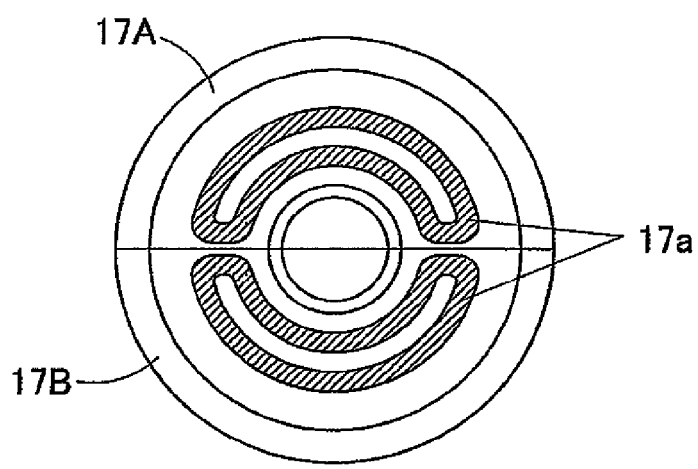
FIG. 25B is a lateral cross sectional diagram of the electromagnet of the turbine unit.

FIGS. 25A and 25B show the turbine unit 5 according to the sixth embodiment. This turbine unit 5 is provided with a plurality of thrust plates 13a made of a ferromagnetic material mounted on the main shaft 13 shown in FIG. 2. Electromagnets 17 are installed in the spindle housing 14 so as to respectively confront the opposite surfaces of each thrust plate 13a.

Each electromagnet 17 is divided into a plurality of pieces, or divided electromagnet bodies 17A, 17B, which are aligned in the circumferential direction, as shown in FIG. 25B. Each of the divided electromagnet bodies 17A, 17B has a coil 17a and a yolk. As a result of this division, assemblage of the electromagnets 17 into the turbine unit can be easily carried out even in the case where a plurality of thrust plates 13a are provided.

In the case of this configuration, the following effects can be observed. That is, in the turbine unit 5, it is desirable to increase the diameter of the thrust plates 13a so that the force of the electromagnets 17 can be made greater in the case where the thrust force resulting from air pressure is great. However, there is a limit in enlarging the diameter of the thrust plates 13a, because a risk arises in that the thrust plates may be destroyed due to the centrifugal force.

In the case where a plurality of thrust plates 13a are provided, as shown in FIGS. 25A and 25B, the support force against the thrust force can be increased without causing destruction due to centrifugal force.

Figure 26:
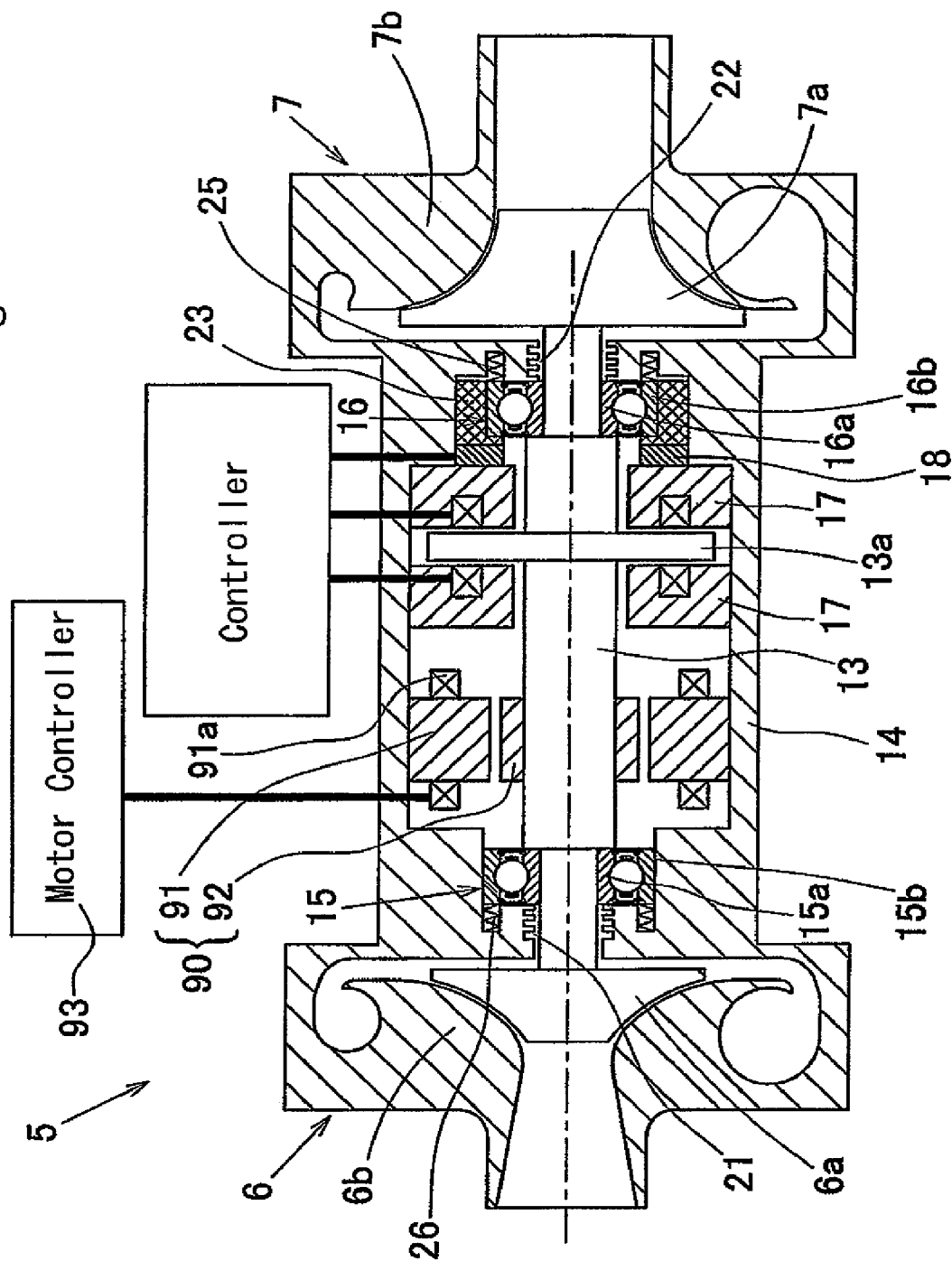
FIG. 26 is a cross sectional diagram showing the turbine unit for refrigerating/cooling air cycle according to the seventh embodiment.

FIG. 26 shows the turbine unit 5 according to the seventh embodiment. This turbine unit 5 has a motor 90 for rotating and driving the main shaft 13. The motor 90 is provided next to electromagnets 17 in the axial direction, and includes a stator 91 provided in the spindle housing 14 and a rotor 92 mounted on the main shaft 13. The stator 91 has stator coils 91a and the rotor 92 is made of a magnet or the like. The motor 90 is controlled by a motor controller 93.

In this turbine unit 5, the drive force of the turbine rotor 7a generated in the expansion turbine 7 and the drive force of the motor 90 rotate and drive the compressor rotor 6a. Therefore, the compressor 6 can be rotated and driven without a pre-compressing unit 2 made up of a blower shown in FIG. 1.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention.

Accordingly, such changes and modifications are, unless they depart from the scope of the present invention as delivered from the claims annexed hereto, to be construed as included therein.

What is claimed is:

1. A turbine unit for refrigerating/cooling air cycle comprising
    a compressor,
    an expansion turbine,
    a main shaft,
    a rolling contact bearing for supporting the main shaft,
    an electromagnet for supporting part or the entirety of a thrust force applied to the main shaft,
    a sensor for detecting the thrust force and a controller for controlling a support force by the electromagnet in accordance with an output of the sensor,
    the compressor having a compressor rotor and the expansion turbine having a turbine rotor,
    the compressor rotor and the turbine rotor being attached to the main shaft so that the compressor rotor is driven by the power generated by the turbine rotor, or by a motor having a motor rotor attached to the main shaft,
    the sensor being interposed between a stationary outer ring of the rolling contact bearing and a spindle housing for supporting the stationary outer ring, and
    the sensor including sensor elements arranged in a circumferential direction of the main shaft, each sensor element having the properties changeable in accordance with a pressing force urged thereupon and capable of electrically detecting the change in the properties, thereby to detect the thrust force from an output of the sensor elements,
    wherein the sensor includes a plurality of magnetostrictors or super magnetostrictors arranged in the circumferential direction of the main shaft and detects a permeability of the magnetostrictors or super magnetostrictors thereby to detect the thrust force, and
    wherein the plurality of magnetostrictors or super magnetostrictors are sandwiched between two yolk members made of a soft magnetic material.

2. The turbine unit for refrigerating/cooling air cycle according to claim 1, wherein the sensor includes a second yolk member placed between the two yolk members and made of a soft magnetic material slightly shorter than the magnetostrictors or super magnetostrictors.

3. The turbine unit for refrigerating/cooling air cycle according to claim 1, wherein the sensor includes a magnetostrictor or super magnetostrictor and a sensor coil arranged therearound, and detects the permeability of the magnetostrictor or super magnetostrictor by measuring the inductance of the sensor coil.

4. The turbine unit for refrigerating/cooling air cycle according to claim 3, wherein a plurality of sensor coils are provided so as to be connected in series so that the outputs of the sensor coils are averaged.

5. The turbine unit for refrigerating/cooling air cycle according to claim 4, wherein an even number of the sensor coils and the magnetostrictors or super magnetostrictors are provided in such a manner that electric currents flow through neighboring sensor coils in opposite directions.

6. The turbine unit for refrigerating/cooling air cycle according to claim 3, further comprising a condenser separate from the sensor, wherein the sensor utilizes resonance between the inductance of the sensor coil and the capacitance of the condenser to measure change in the inductance from the change in the resonant frequency, which changes in accordance with the change in the inductance.

7. The turbine unit for refrigerating/cooling air cycle according to claim 3, wherein the sensor includes an exciting coil arranged around the magnetostrictor or super magnetostrictor in addition to the sensor coil and supplies an alternating exciting current having a constant frequency and a constant amplitude through the exciting coil to detect the voltage induced across the sensor coil, thereby to measure the thrust force.

8. The turbine unit for refrigerating/cooling air cycle according to claim 1, wherein the sensor is a Hall sensor to detect the density of the magnetic flux, which changes together with change in the permeability of the magnetostrictor or super magnetostrictor in the sensor, thereby to measure the thrust force.

9. The turbine unit for refrigerating/cooling air cycle according to claim 1, wherein the sensor is interposed between the stationary outer ring of the rolling contact bearing and the spindle housing for supporting the stationary outer ring directly, or interposed therebetween via another member.

10. The turbine unit for refrigerating/cooling air cycle according to claim 9, further comprising a bearing housing with which the stationary outer ring of the rolling contact bearing is fixedly engaged, the bearing housing being engaged in an inner diametric hole provided in the spindle housing in such a manner as to be moveable in the axial direction, and the sensor being interposed between an end face of the bearing housing and the spindle housing or a member secured to the spindle housing.

11. The turbine unit for refrigerating/cooling air cycle according to claim 1, further comprising a first resilient element for applying a preload to the sensor.

12. The turbine unit for refrigerating/cooling air cycle according to claim 11, wherein the preload applied by means of the first resilient element is equal to or greater than the average thrust force which is applied to the main shaft through air within the compressor and the expansion turbine.

13. The turbine unit for refrigerating/cooling air cycle according to claim 11, further comprising a second resilient element, wherein a plurality of rolling contact bearings are provided, the sensor is arranged in the vicinity of one of the rolling contact bearings, other rolling contact bearings being disposed in such a manner as to be moveable in the axial direction relative to the spindle housing and elastically supported by the second resilient element.

14. The turbine unit for refrigerating/cooling air cycle according to claim 13, wherein the second resilient element is interposed between the stationary outer ring of the other rolling contact bearing and the spindle housing, between a member for securing the stationary outer ring of the other rolling contact bearing and the spindle housing, or between an inner ring of the other rolling contact bearing and the main shaft.

15. The turbine unit for refrigerating/cooling air cycle according to claim 13, wherein the second resilient element has a smaller spring constant than the first resilient element.

16. The turbine unit for refrigerating/cooling air cycle according to claim 1, wherein a plurality of thrust plates in flange form made of a ferromagnetic body are provided in the main shaft and a plurality of electromagnets are disposed in the spindle housing in face-to-face relation with opposite end faces of each thrust plate.

17. The turbine unit for refrigerating/cooling air cycle according to claim 16, wherein electromagnets are divided into a plurality of pieces aligned in the circumferential direction.

18. The turbine unit for refrigerating/cooling air cycle according to claim 17, wherein the number of poles, the size and the number of turns of a built-in coil among the individual pieces into which electromagnets are divided are set to be the same.

19. The turbine unit for refrigerating/cooling air cycle according to claim 1, wherein the sensor further includes:
  a second yolk member placed between the two yolk members and made of a soft magnetic material slightly shorter than the magnetostrictors or super magnetostrictors; and
  a sensor coil arranged around the magnetostrictors or super magnetostrictors,
  wherein the sensor detects the permeability of the magnetostrictors or super magnetostrictors by measuring the inductance of the sensor coil, and
  wherein the second yolk member is formed in ring shape and has a coil accommodating hole for accommodating the sensor coil with a space in between.

20. A turbine unit for refrigerating/cooling air cycle comprising
  a compressor,
  an expansion turbine,
  a main shaft,
  a rolling contact bearing for supporting the main shaft,
  an electromagnet for supporting part or the entirety of a thrust force applied to the main shaft,
  a sensor for detecting the thrust force and a controller for controlling a support force by the electromagnet in accordance with an output of the sensor,
  the compressor having a compressor rotor and the expansion turbine having a turbine rotor,
  the compressor rotor and the turbine rotor being attached to the main shaft so that the compressor rotor is driven by the power generated by the turbine rotor, or by a motor having a motor rotor attached to the main shaft,
  the sensor being interposed between a stationary outer ring of the rolling contact bearing and a spindle housing for supporting the stationary outer ring, and
  the sensor including sensor elements arranged in a circumferential direction of the main shaft, each sensor element having the properties changeable in accordance with a pressing force urged thereupon and capable of electrically detecting the change in the properties, thereby to detect the thrust force from an output of the sensor elements,
  wherein the sensor includes a plurality of magnetostrictors or super magnetostrictors arranged in the circumferential direction of the main shaft and detects a permeability of the magnetostrictors or super magnetostrictors thereby to detect the thrust force, and
  wherein the turbine unit further comprises a permanent magnet magnetized in the direction of the thickness and provided on each of the magnetostrictors or super magnetostrictors in such a manner as to make direct contact with an end face thereof, the magnetostrictor or super magnetostrictor and the permanent magnet being sandwiched between two yolk members made of a soft magnetic material.

21. The turbine unit for refrigerating/cooling air cycle according to claim 20, further comprising a second yolk member placed between said two yolk members and made of a soft magnetic material slightly shorter than the total length of the magnetostrictor or super magnetostrictor and the permanent magnet, that are layered on top of each other.

22. A turbine unit for refrigerating/cooling air cycle comprising
  a compressor,
  an expansion turbine,
  a main shaft,
  a rolling contact bearing for supporting the main shaft,
  an electromagnet for supporting part or the entirety of a thrust force applied to the main shaft,
  a sensor for detecting the thrust force and a controller for controlling a support force by the electromagnet in accordance with an output of the sensor,
  the compressor having a compressor rotor and the expansion turbine having a turbine rotor,
  the compressor rotor and the turbine rotor being attached to the main shaft so that the compressor rotor is driven by the power generated by the turbine rotor, or by a motor having a motor rotor attached to the main shaft,
  the sensor being interposed between a stationary outer ring of the rolling contact bearing and a spindle housing for supporting the stationary outer ring, and
  the sensor including sensor elements arranged in a circumferential direction of the main shaft, each sensor element having the properties changeable in accordance with a pressing force urged thereupon and capable of electrically detecting the change in the properties, thereby to detect the thrust force from an output of the sensor elements, wherein the sensor includes a magnetostrictor or super magnetostrictor and a sensor coil arranged therearound, and detects the permeability of the magnetostrictor or super magnetostrictor by measuring the inductance of the sensor coil, and further comprising a temperature sensor disposed in the vicinity of the magnetostrictor or super magnetostrictor and a corrector for correcting the results of measurement of the inductance or the permeability on the basis of the output of the temperature sensor.

23. A turbine unit for refrigerating/cooling air cycle comprising a compressor, an expansion turbine, a main shaft, a rolling contact bearing for supporting the main shaft, an electromagnet for supporting part or the entirety of a thrust force applied to the main shaft, a sensor for detecting the thrust force and a controller for controlling a support force by the electromagnet in accordance with an output of the sensor, the compressor having a compressor rotor and the expansion turbine having a turbine rotor, the compressor rotor and the turbine rotor being attached to the main shaft so that the compressor rotor is driven by the power generated by the turbine rotor, or by a motor having a motor rotor attached to the main shaft, the sensor being interposed between a stationary outer ring of the rolling contact bearing and a spindle housing for supporting the stationary outer ring, and the sensor including sensor elements arranged in a circumferential direction of the main shaft, each sensor element having the properties changeable in accordance with a pressing force urged thereupon and capable of electrically detecting the change in the properties, thereby to detect the thrust force from an output of the sensor elements, wherein the sensor includes a plurality of pressure sensitive resistance elements and detects the change in the resistance value of the pressure sensitive resistance elements, and wherein the turbine unit further comprises a temperature sensor arranged in the vicinity of the pressure sensitive resistance elements and a corrector for correcting the resistance value of the pressure sensitive resistance elements on the basis of an output of the temperature sensor.

24. The turbine unit for refrigerating/cooling air cycle according to claim 23, wherein the detected values of the pressure sensitive resistance elements are averaged.

25. The turbine unit for refrigerating/cooling air cycle according to claim 23, wherein the sensor includes an elastic member for equalizing the pressure on a surface through which force is applied to the pressure sensitive resistance element.

26. A turbine unit for refrigerating/cooling air cycle comprising a compressor, an expansion turbine, a main shaft, a rolling contact bearing for supporting the main shaft, an electromagnet for supporting part or the entirety of a thrust force applied to the main shaft, a sensor for detecting the thrust force and a controller for controlling a support force by the electromagnet in accordance with an output of the sensor, the compressor having a compressor rotor and the expansion turbine having a turbine rotor, the compressor rotor and the turbine rotor being attached to the main shaft so that the compressor rotor is driven by the power generated by the turbine rotor, or by a motor having a motor rotor attached to the main shaft, the sensor being interposed between a stationary outer ring of the rolling contact bearing and a spindle housing for supporting the stationary outer ring, and the sensor including sensor elements arranged in a circumferential direction of the main shaft, each sensor element having the properties changeable in accordance with a pressing force urged thereupon and capable of electrically detecting the change in the properties, thereby to detect the thrust force from an output of the sensor elements, wherein the sensor includes a plurality of strain gauges, and wherein the turbine unit further comprises a temperature sensor arranged in the vicinity of the strain gauges and a corrector for correcting the strain measured by the strain gauges on the basis of an output of the temperature sensor.

* * * * *

UNITED STATES PATENT AND TRADEMARK OFFICE
CERTIFICATE OF CORRECTION

| | | |
|---|---|---|
| PATENT NO. | : 8,215,898 B2 | Page 1 of 1 |
| APPLICATION NO. | : 12/064761 | |
| DATED | : July 10, 2012 | |
| INVENTOR(S) | : Tsugito Nakazeki et al. | |

It is certified that error appears in the above-identified patent and that said Letters Patent is hereby corrected as shown below:

In the Claims:

In claim 23, column 26, line 2, "an output" should be -- the output --.

In claim 26, column 26, line 44, "an output" should be -- the output --.

Signed and Sealed this
Twenty-fifth Day of September, 2012

David J. Kappos
*Director of the United States Patent and Trademark Office*

UNITED STATES PATENT AND TRADEMARK OFFICE
CERTIFICATE OF CORRECTION

PATENT NO. : 8,215,898 B2  Page 1 of 1
APPLICATION NO. : 12/064761
DATED : July 10, 2012
INVENTOR(S) : Tsugito Nakazeki et al.

It is certified that error appears in the above-identified patent and that said Letters Patent is hereby corrected as shown below:

This certificate supersedes the Certificate of Correction issued September 25, 2012. The certificate is vacated since request was filed in error by patentee. The patent is reinstated to its originally-issued form.

Claim 23, Column 26, line 2, "the output" should be --an output--.

Claim 26, Column 26, line 44, "the output" should be --an output--.

Signed and Sealed this
Fourth Day of December, 2012

David J. Kappos
*Director of the United States Patent and Trademark Office*